US010267192B2

(12) United States Patent
Takeshima et al.

(10) Patent No.: US 10,267,192 B2
(45) Date of Patent: Apr. 23, 2019

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi-ken (JP)

(72) Inventors: Shinichi Takeshima, Numazu (JP); Hiromasa Nishioka, Susono (JP); Kiyoshi Fujiwara, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 53 days.

(21) Appl. No.: 15/681,821

(22) Filed: Aug. 21, 2017

(65) Prior Publication Data

US 2018/0112569 A1 Apr. 26, 2018

(30) Foreign Application Priority Data

Oct. 20, 2016 (JP) ................................ 2016-206162

(51) Int. Cl.
*F01N 3/10* (2006.01)
*F01N 3/20* (2006.01)
(Continued)

(52) U.S. Cl.
CPC ............. *F01N 3/106* (2013.01); *F01N 3/021* (2013.01); *F01N 3/023* (2013.01); *F01N 3/025* (2013.01);
(Continued)

(58) Field of Classification Search
CPC ...... F01N 11/00; F01N 11/002; F01N 13/009; F01N 3/021; F01N 3/023; F01N 3/025;
(Continued)

(56) References Cited

U.S. PATENT DOCUMENTS

2009/0071420 A1 3/2009 Huber et al.
2009/0120072 A1 5/2009 Dalla Betta et al.
(Continued)

FOREIGN PATENT DOCUMENTS

JP 2008-298000 12/2008
JP 2010-270664 12/2010

OTHER PUBLICATIONS

U.S. Appl. No. 15/635,756, filed Jun. 28, 2017.

*Primary Examiner* — Patrick D Maines
*Assistant Examiner* — Dapinder Singh
(74) *Attorney, Agent, or Firm* — Finnegan, Henderson, Farabow, Garrett & Dunner, LLP

(57) ABSTRACT

An exhaust purification system of an internal combustion engine comprising an exhaust treatment catalyst (13) arranged in an engine exhaust passage and a heat and hydrogen generation device (50) able to feed only heat or heat and hydrogen to the exhaust treatment catalyst (13). When the warm-up operation of the heat and hydrogen generation device (50) is completed and a reforming action by a reformer catalyst (54) becomes possible, if the temperature of the exhaust treatment catalyst (13) is a preset activation temperature or more, a partial oxidation reaction is performed at the heat and hydrogen generation device (50) and the generated heat and hydrogen are fed to the exhaust treatment catalyst (50). At this time, if the temperature of the exhaust treatment catalyst (13) is less than the preset activation temperature, a complete oxidation reaction by a lean air-fuel ratio is continued and a heat is fed to the exhaust treatment catalyst (13).

3 Claims, 12 Drawing Sheets

(51) Int. Cl.
- F01N 3/02 (2006.01)
- F01N 9/00 (2006.01)
- F01N 11/00 (2006.01)
- F01N 3/08 (2006.01)
- F01N 3/22 (2006.01)
- F01N 3/30 (2006.01)
- F01N 3/021 (2006.01)
- F01N 3/023 (2006.01)
- F01N 3/025 (2006.01)
- F01N 3/035 (2006.01)
- F01N 13/00 (2010.01)

(52) U.S. Cl.
CPC ........... *F01N 3/035* (2013.01); *F01N 3/0842* (2013.01); *F01N 3/105* (2013.01); *F01N 3/206* (2013.01); *F01N 3/2006* (2013.01); *F01N 3/2066* (2013.01); *F01N 3/22* (2013.01); *F01N 3/30* (2013.01); *F01N 3/306* (2013.01); *F01N 11/00* (2013.01); *F01N 11/002* (2013.01); *F01N 13/009* (2014.06); *F01N 3/2033* (2013.01); *F01N 3/2073* (2013.01); *F01N 9/00* (2013.01); *F01N 2240/02* (2013.01); *F01N 2240/14* (2013.01); *F01N 2240/30* (2013.01); *F01N 2610/03* (2013.01); *F01N 2610/04* (2013.01); *Y02T 10/24* (2013.01); *Y02T 10/26* (2013.01); *Y02T 10/47* (2013.01)

(58) Field of Classification Search
CPC ........ F01N 3/035; F01N 3/0842; F01N 3/105; F01N 3/106; F01N 3/2006; F01N 3/206; F01N 3/2066; F01N 3/22; F01N 3/30; F01N 3/306; F01N 3/2033; F01N 3/2073; F01N 9/00; F01N 2240/02; F01N 2240/14; F01N 2240/30; F01N 2610/03; F01N 2610/04; Y02T 10/24; Y02T 10/26; Y02T 10/47
USPC .......................... 60/274, 286, 295, 299, 300
See application file for complete search history.

(56) References Cited

U.S. PATENT DOCUMENTS

| | | | |
|---|---|---|---|
| 2010/0275584 A1* | 11/2010 | Wada | B01D 53/9495 60/285 |
| 2015/0121857 A1* | 5/2015 | Tsumagari | F01N 3/025 60/303 |

* cited by examiner

FIG. 2

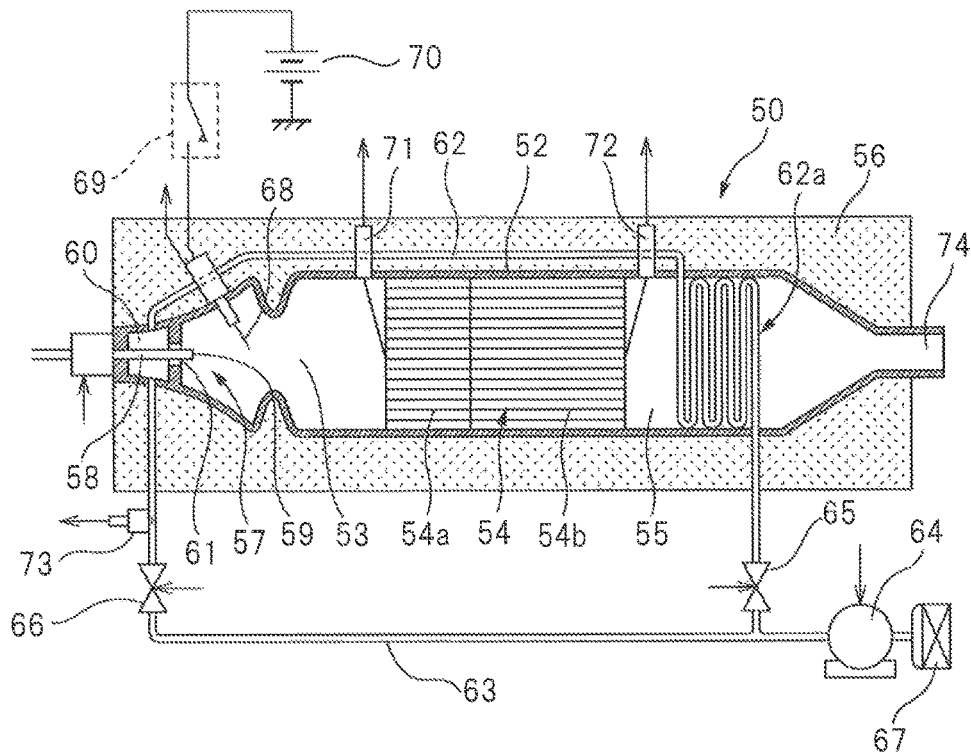

FIG. 3

REFORMING REACTION OF DIESEL FUEL

LHV NOTATION (a) COMPLETE OXIDATION REACTION
$CH_{1.83} + 1.4575 O_2 \rightarrow CO_2 + 0.915 H_2O$, $\Delta H^0 = -600 \text{kJ/mol-C}$ (b) PARTIAL OXIDATION REFORMING REACTION
$CH_{1.83} + 0.5 O_2 \rightarrow CO + 0.915 H_2$, $\Delta H^0 = -86 \text{kJ/mol-C}$ (c) STEAM REFORMING REACTION
$CH_{1.83} + H_2O \rightarrow CO + 1.915 H_2$, $\Delta H^0 = +146 \text{kJ/mol-C}$ (d) WATER GAS SHIFT REACTION
$CO + H_2O \rightarrow CO_2 + H_2$, $\Delta H^0 = -41 \text{kJ/mol-C}$

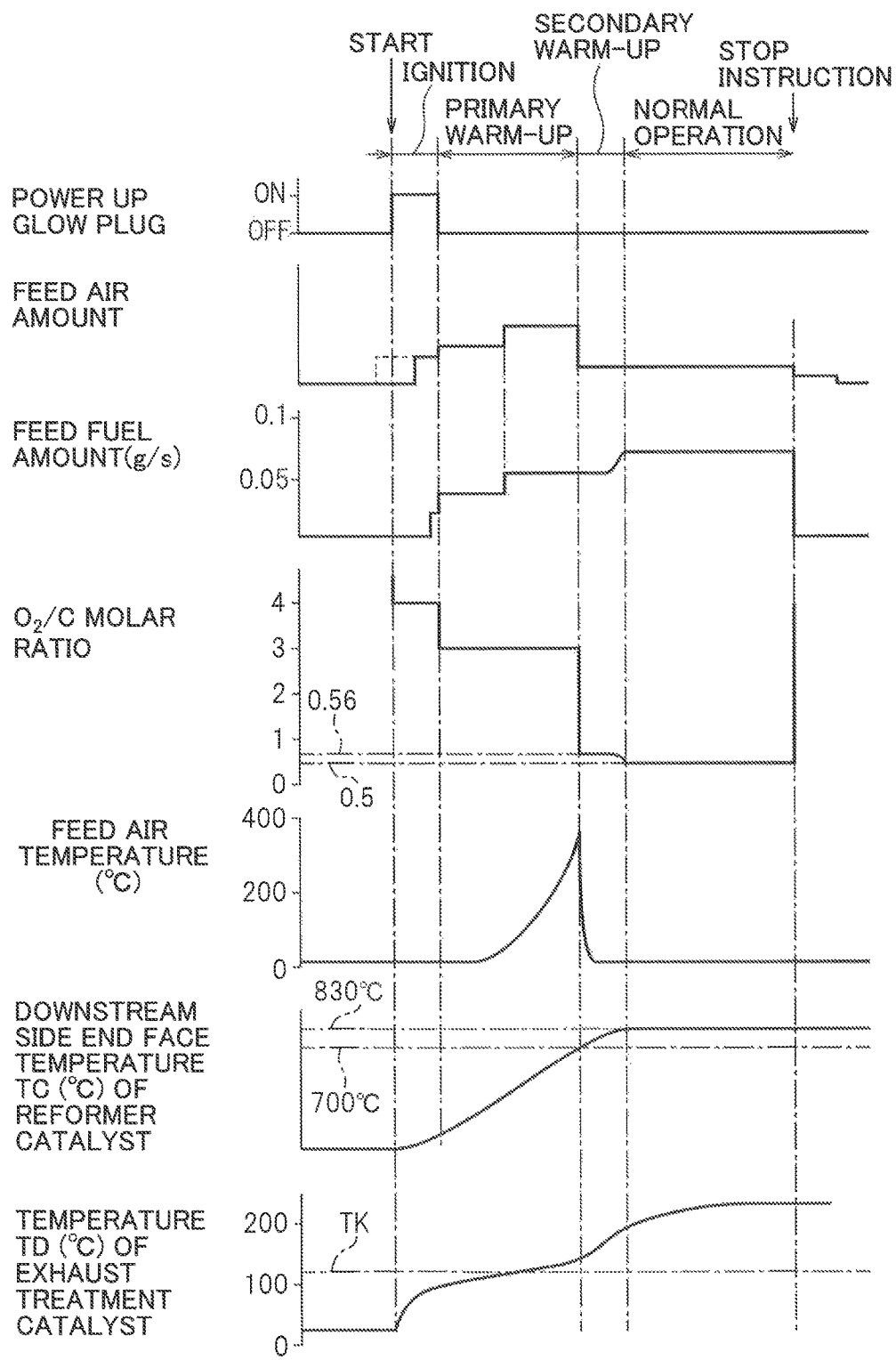

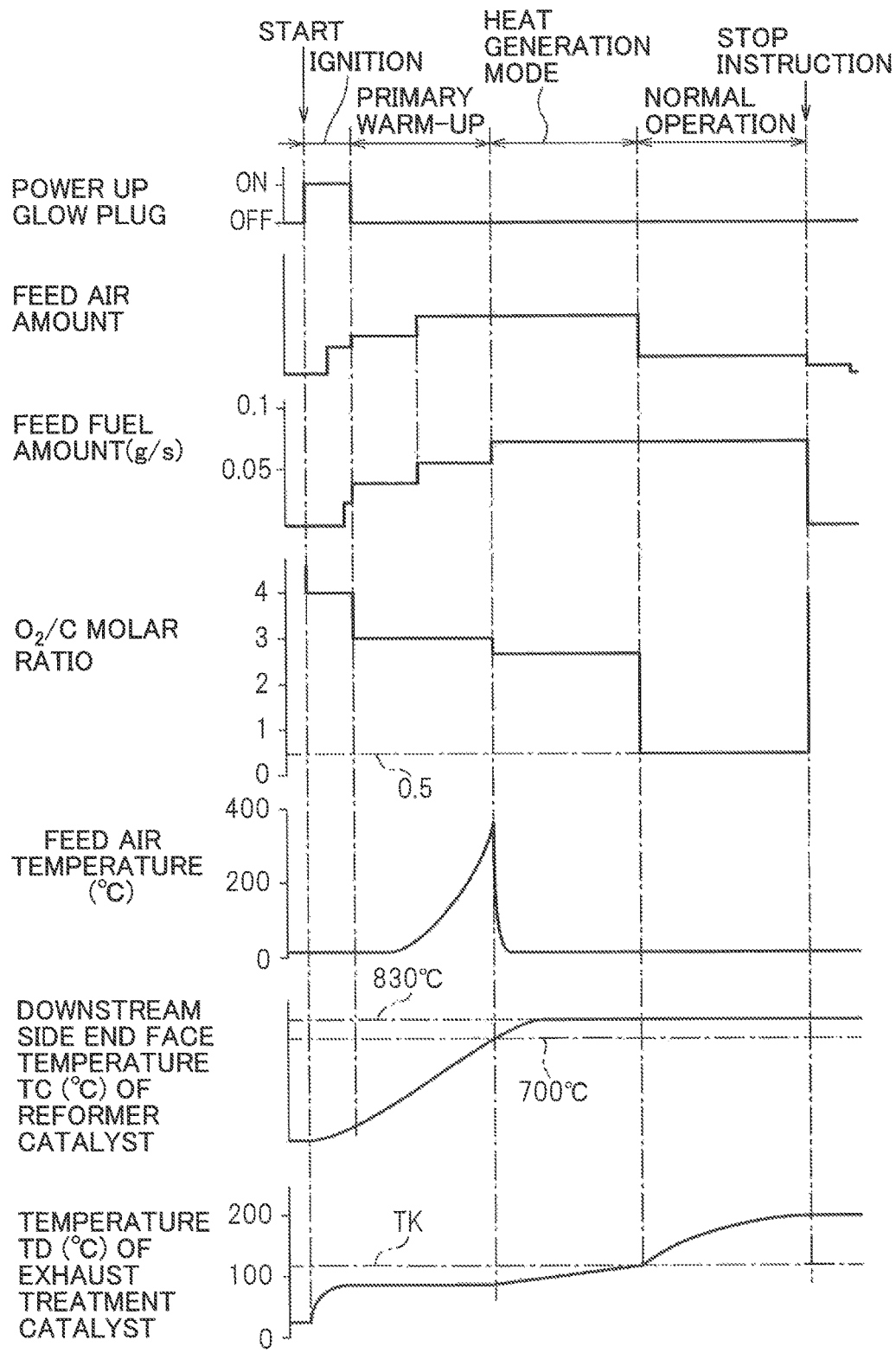

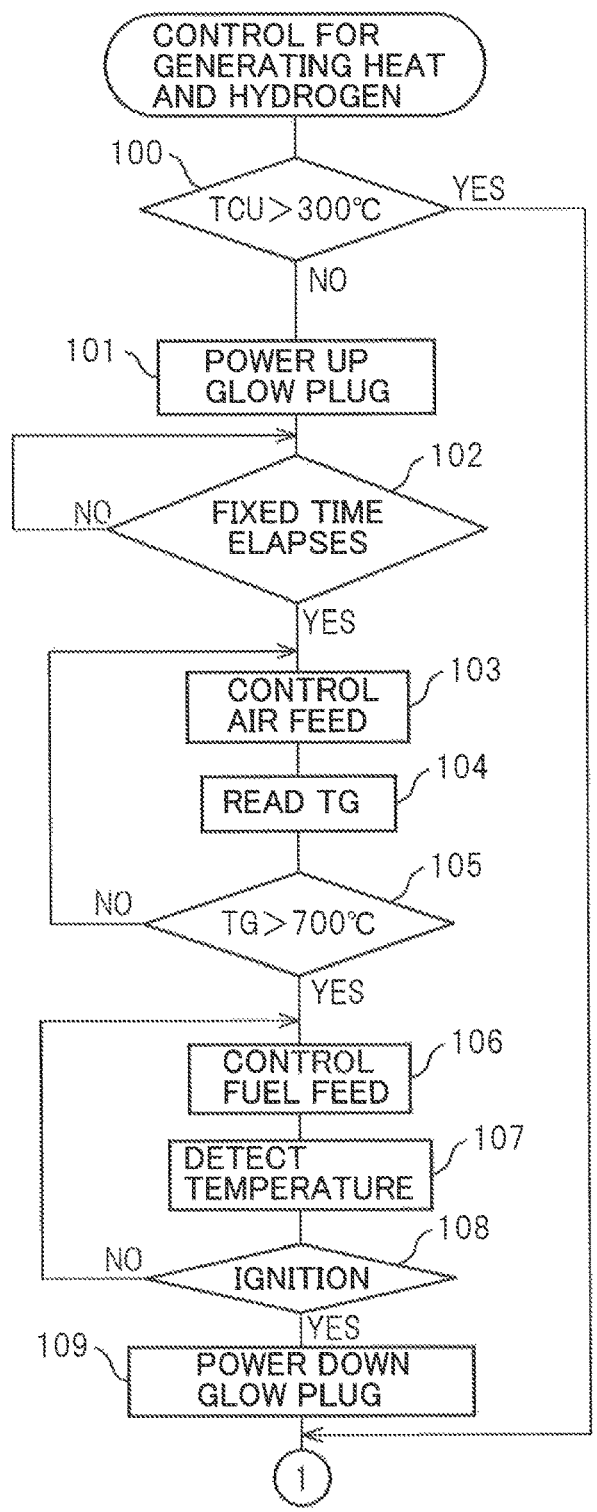

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine provided with a fuel reformer, an air feeder for feeding air to the fuel reformer, and a fuel feeder for feeding fuel to the fuel reformer and designed to respectively feed fuel and air from the fuel feeder and air feeder to the fuel reformer at the time of engine startup so as to cause an exothermic reaction and to feed reformed gas holding the heat generated in this exothermic reaction to a three-way catalyst arranged in an engine exhaust passage and thereby promote warm-up of the three-way catalyst (for example, see Japanese Patent Publication No. 2008-298000A).

SUMMARY OF INVENTION

Technical Problem

In this regard, when feeding heat or hydrogen, or heat and hydrogen generated at such a fuel reformer to an exhaust treatment catalyst such as a three-way catalyst to promote warm-up of the exhaust treatment catalyst, if the temperature of the exhaust treatment catalyst is higher than an activation temperature, feeding hydrogen to the exhaust treatment catalyst or feeding heat and hydrogen to the exhaust treatment catalyst enables quicker warm-up of the exhaust treatment catalyst by less fuel than feeding just heat. As opposed to this, when the temperature of the exhaust treatment catalyst is lower than the activation temperature, even if feeding hydrogen to the exhaust treatment catalyst, it is not possible to promote warm-up of the exhaust treatment catalyst. At this time, by feeding only heat to the exhaust treatment catalyst, it is possible to quickly warm up the exhaust treatment catalyst by less fuel.

In this way, to quickly warm up the exhaust treatment catalyst by less fuel, it is necessary to feed hydrogen, or heat and hydrogen to the exhaust treatment catalyst or to feed only heat to the exhaust treatment catalyst in accordance with the temperature of the exhaust treatment catalyst. However, in the above-mentioned internal combustion engine, this is not considered at all.

Solution to Problem

According to the present invention, there is provided an exhaust purification system of an internal combustion engine comprising:

an exhaust treatment catalyst arranged in an engine exhaust passage, a heat and hydrogen generation device able to feed only heat or heat and hydrogen to the exhaust treatment catalyst so as to warm up the exhaust treatment catalyst, the heat and hydrogen generation device being provided with a reformer catalyst to which a combustion gas of fuel and air is fed; and an electronic control unit, wherein the electronic control unit is configured to perform an operation for warm-up of the heat and hydrogen generation device under a lean air-fuel ratio after startup of the heat and hydrogen generation device until a reforming action by the reformer catalyst becomes possible, the electronic control unit is configured to perform a partial oxidation reaction at the heat and hydrogen generation device and feed a generated heat and hydrogen to the exhaust treatment catalyst if a temperature of the exhaust treatment catalyst is a preset activation temperature or more when the warm-up operation of the heat and hydrogen generation device is completed and a reforming action by the reformer catalyst becomes possible, and the electronic control unit is configured to continue a complete oxidation reaction by a lean air-fuel ratio and feed a heat to the exhaust treatment catalyst if the temperature of the exhaust treatment catalyst is less than the preset activation temperature when the warm-up operation of the heat and hydrogen generation device is completed and a reforming action by the reformer catalyst becomes possible.

Advantageous Effects of Invention

When the temperature of the exhaust treatment catalyst is a preset activation temperature or more, heat and hydrogen is fed to the exhaust treatment catalyst, while when the temperature of the exhaust treatment catalyst is less than the preset activation temperature, heat is fed to the exhaust treatment catalyst and thereby it is possible to quickly warm up the exhaust treatment catalyst by less fuel.

BRIEF DESCRIPTION OF DRAWINGS

FIG. 2 is an overall view of a heat and hydrogen generation device.

FIG. 3 is a view for explaining a reforming reaction of diesel fuel.

FIG. 9 is a time chart showing heat and hydrogen generation control.

FIG. 11 is a time chart showing heat and hydrogen generation control.

FIG. 12 is a flow chart for performing heat and hydrogen generation control.

DESCRIPTION OF EMBODIMENTS

Figure 1:
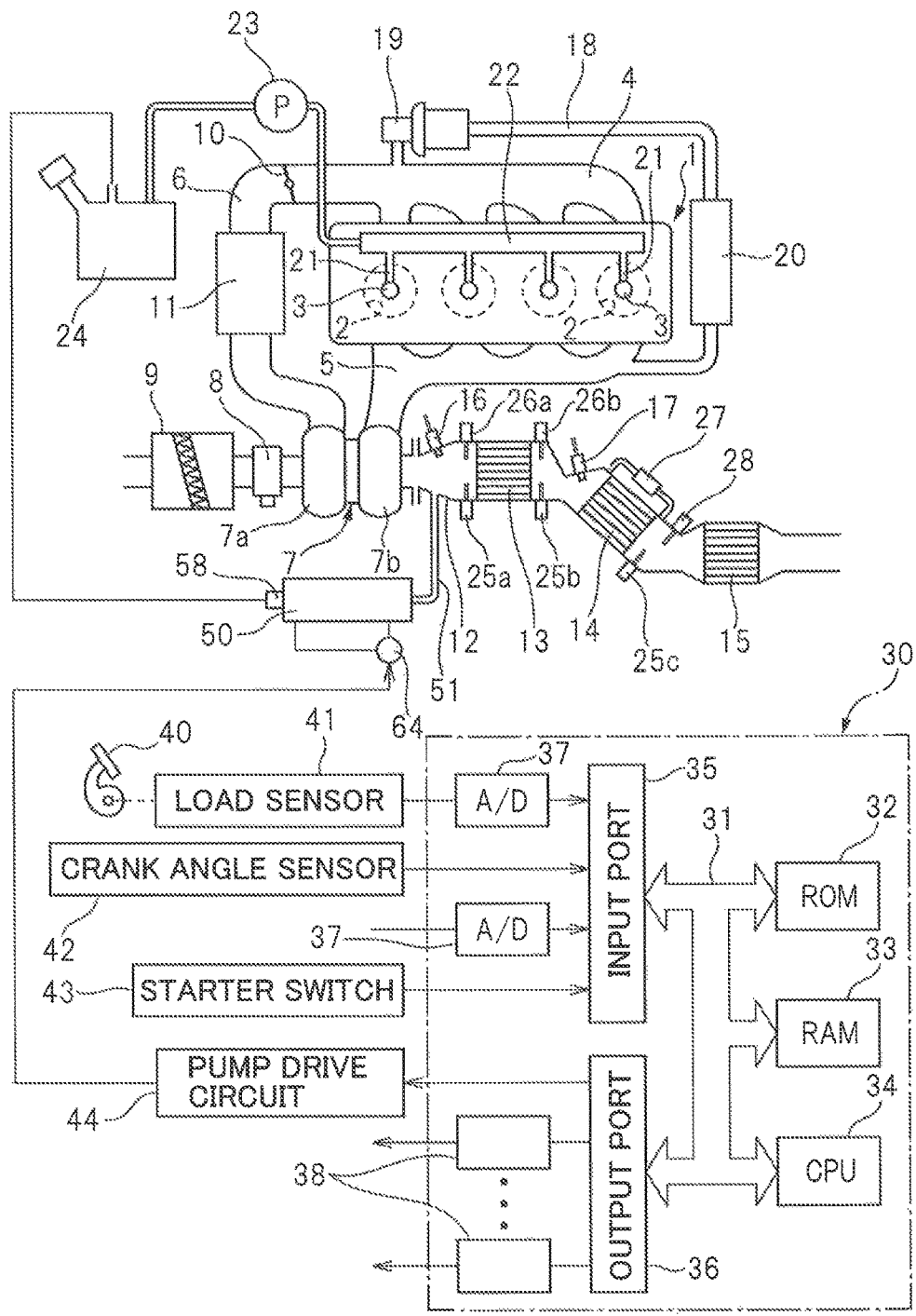
FIG. 1 is an overall view of an internal combustion engine.

FIG. 1 shows an overall view of a compression ignition type internal combustion engine. Referring to FIG. 1, 1 indicates an engine body, 2 a combustion chamber of a cylinder, 3 an electronically controlled fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7. The inlet of the compressor 7a is connected through an intake air amount detector 8 to an air cleaner 9. Inside of the intake duct 6, a throttle valve 10 driven by an actuator is arranged. Around the intake duct 6, a cooling device 11 is arranged for cooling the intake air flowing through the inside of the intake duct 6. In an embodiment shown in FIG. 1, the engine cooling water is guided to the inside of the cooling device 11 where the cooling water is used to cool the intake air.

On the other hand, the exhaust manifold 5 is connected to the inlet of an exhaust turbine 7b of the exhaust turbocharger 7. The outlet of the exhaust turbine 7b is connected through an exhaust pipe 12 to the inlet of an exhaust treatment catalyst 13. In an example shown in FIG. 1, this exhaust treatment catalyst 13 is comprised of a $NO_x$ storage catalyst. The outlet of the exhaust treatment catalyst 13 is connected to a particulate filter 14 carrying a $NO_x$ selective reduction catalyst thereon, and a sweeper catalyst 15 comprised of, for example, an oxidation catalyst is arranged downstream of the particulate filter 14. A fuel feed valve 16 for feeding, for example, a diesel fuel is arranged in the exhaust pipe 12 upstream of the exhaust treatment catalyst 13, and a urea feed valve 17 for feeding a urea water is arranged between the exhaust treatment catalyst 13 and the particulate filter 14.

The exhaust manifold 5 and the intake manifold 4 are connected with each other through an exhaust gas recirculation (hereinafter referred to as an "EGR") passage 18. Inside the EGR passage 18, an electronic control type EGR control valve 19 is arranged. Further, around the EGR passage 18, a cooling device 20 is arranged for cooling the EGR gas flowing through the inside of the EGR passage 18. In the embodiment shown in FIG. 1, the engine cooling water is guided to the inside of the cooling device 20 where the cooling water is used to cool the EGR gas. Each fuel injector 3 is connected through a fuel feed pipe 21 to a common rail 22, and the common rail 22 is connected to a fuel tank 24 via an electronically controlled fuel pump 23 able to control the discharge rate. The fuel stored in the fuel tank 24 is supplied by the fuel pump 23 to the inside of the common rail 22. The fuel fed into the common rail 22 is fed through the fuel feed pipes 21 to the fuel injectors 3.

The electronic control unit 30 is comprised of a digital computer provided with a ROM (read only memory) 32, RAM (random access memory) 33, CPU (microprocessor) 34, input port 35, and output port 36, which are interconnected with each other by a bidirectional bus 31. As shown in FIG. 1, temperature sensors 25a, 25b and 25c are arranged on the upstream side of the exhaust treatment catalyst 13, the downstream side of the exhaust treatment catalyst 13, and the downstream side of the particulate filter 14, respectively, and $NO_x$ sensors 26a and 26b are arranged on the upstream side of the exhaust treatment catalyst 13 and the downstream side of the exhaust treatment catalyst 13, respectively. In addition, a differential pressure sensor 27 for detecting the differential pressure before and after the particulate filter 14 is attached to the particulate filter 14, and an air-fuel ratio sensor 28 is arranged downstream of the particulate filter 14. The output signals of these temperature sensors 25a, 25b, 25c, $NO_x$ sensors 26a, 26b, differential pressure sensor 27, air-fuel ratio sensor 28 and intake air amount detector 8 are input through corresponding AD converters 37 to the input port 35.

Further, an accelerator pedal 40 is connected to a load sensor 41 generating an output voltage proportional to the amount of depression of the accelerator pedal 40. The output voltage of the load sensor 41 is input through a corresponding AD converter 37 to the input port 35. Furthermore, the input port 35 is connected to a crank angle sensor 42 generating an output pulse each time a crankshaft rotates by for example 15°. On the other hand, the output port 36 is connected through corresponding drive circuits 38 to the fuel injectors 3, actuator for driving the throttle valve 10, fuel feed valve 16, urea feed valve 17, EGR control valve 19, and fuel pump 23.

Referring to FIG. 1, a heat and hydrogen generation device 50 which is able to generate heat and hydrogen or only heat is provided, and this heat and hydrogen generation device 50 is connected to the exhaust pipe 12 upstream of the exhaust treatment catalyst 13 via a feed conduit 51. This heat and hydrogen generation device 50 is started to operate, for example, at the time of the start of operation of the engine, and heat and hydrogen or only heat which are generated in the heat and hydrogen generation device 50 are fed to the exhaust treatment catalyst 13 via the feed conduit 51. Thereby, a warm up operation of the exhaust treatment catalyst 13 is performed by these heat and hydrogen or only heat. This heat and hydrogen generation device 50 is arranged, for example, inside the engine compartment of the vehicle.

FIG. 2 shows an overall view of the heat and hydrogen generation device 50. This heat and hydrogen generation device 50 is cylindrically shaped as a whole. Referring to FIG. 2, 52 indicates a cylindrical housing of the heat and hydrogen generation device 50, 53 a burner combustion chamber formed in the housing 52, 54 a reformer catalyst arranged in the housing 52, and 55 a gas outflow chamber formed in the housing 52. In the embodiment shown in FIG. 2, the reformer catalyst 54 is arranged at the center of the housing 52 in the longitudinal direction, the burner combustion chamber 53 is arranged at one end part of the housing 52 in the longitudinal direction, and the gas outflow chamber 55 is arranged at the other end part of the housing 52 in the longitudinal direction. As shown in FIG. 2, in this embodiment, the entire outer circumference of the housing 52 is covered by a heat insulating material 56.

As shown in FIG. 2, a burner 57 provided with a fuel injector 58 is arranged at one end part of the burner combustion chamber 53. The tip of the fuel injector 58 is arranged in the burner combustion chamber 53, and a fuel injection port 59 is formed at the tip of the fuel injector 58. Further, an air chamber 60 is formed around the fuel injector 58, and an air feed port 61 for ejecting air in the air chamber 60 toward the inside of the burner combustion chamber 53 is formed around the tip of the fuel injector 58. In the embodiment shown in FIG. 2, the fuel injector 58 is connected to the fuel tank 24 as shown in FIG. 1, and fuel inside the fuel tank 24 is injected from the fuel injection port 59 of the fuel injector 58. In the embodiment shown in FIGS. 1 and 2, this fuel is comprised of diesel fuel.

The air chamber 60 is connected on one hand through a high temperature air flow passage 62 to an air pump 64 able to control the discharge rate and is connected on the other hand through a low temperature air flow passage 63 to the air pump 64 able to control the discharge rate. As shown in FIG. 2, a high temperature air valve 65 and low temperature air valve 66 are arranged in the high temperature air flow passage 62 and the low temperature air flow passage 63, respectively. Further, as shown in FIG. 2, the high temperature air flow passage 62 is provided with a heat exchange part arranged in the gas outflow chamber 55. This heat exchange part is shown diagrammatically in FIG. 1 by reference notation 62*a*. Note that, this heat exchange part 62*a* may also be formed downstream of the reformer catalyst 54 around the housing 52 defining the gas outflow chamber 55. That is, it is preferable that this heat exchange part 62*a* is arranged or formed at a location where a heat exchange action is performed using the heat of the high temperature gas flowing out from the gas outflow chamber 55. On the other hand, the low temperature air flow passage 63 does not have a heat exchange part performing the heat exchange action using the heat of the high temperature gas flowing out from the gas outflow chamber 55 in this way.

If the high temperature air valve 65 opens and the low temperature air valve 66 is made to close, the outside air is fed through the air cleaner 67, air pump 64, high temperature air flow passage 62, and air chamber 60 into the burner combustion chamber 53 from the air feed port 61. At this time, the outside air, that is, air, is made to flow within the heat exchange part 62*a*. As opposed to this, if the low temperature air valve 66 opens and the high temperature air valve 65 is made to close, the outside air, that is, the air, is fed through the air cleaner 67, air pump 64, low temperature air flow passage 63, and air chamber 60 from the air feed port 61. Therefore, the high temperature air valve 65 and low temperature air valve 66 form a switching device able to switch the air flow passage for feeding air through the air chamber 60 to the air feed port 61 between the high temperature air flow passage 62 and the low temperature air flow passage 63.

On the other hand, an ignition device 68 is arranged in the burner combustion chamber 53. In the embodiment shown in FIG. 2, this ignition device 68 is comprised of a glow plug. This glow plug 68 is connected through a switch 69 to a power supply 70. On the other hand, in the embodiment shown in FIG. 2, the reformer catalyst 54 is comprised of an oxidizing part 54*a* and a reforming part 54*b*. In the example shown in FIG. 2, the substrate of the reformer catalyst 54 is comprised of zeolite. On this substrate, at the oxidizing part 54*a*, mainly palladium Pd is carried, while at the reforming part 54*b*, mainly rhodium Rh is carried. Further, a temperature sensor 71 for detecting the temperature of the upstream side end face of the oxidizing part 54*a* of the reformer catalyst 54 is arranged in the burner combustion chamber 53, and a temperature sensor 72 for detecting the temperature of the downstream side end face of the reforming part 54*b* of the reformer catalyst 54 is arranged in the gas outflow chamber 55. Furthermore, a temperature sensor 73 for detecting the temperature of the air flowing within the low temperature air flow passage 63 is arranged in the low temperature air flow passage 63 positioned at the outside of the heat insulating material 56.

The output signals of these temperature sensors 71, 72 and 73 are input to the input port 35 through corresponding AD converters 37 shown in FIG. 1, respectively. Further, the output signal showing the resistance value of the glow plug 68 is input to the input port 35 through a corresponding AD converter 37 shown in FIG. 1. On the other hand, the output port 36 shown in FIG. 1 is connected through corresponding drive circuits 38 to the fuel injectors 58, high temperature air valve 65, low temperature air valve 66, and switch 69. Furthermore, as shown in FIG. 1, the output port 36 is connected to a pump drive circuit 44 controlling the discharge rate of the air pump 64. The discharge rate of the air pump 64 is controlled by this pump drive circuit 44 so as to become the instructed value of the discharge rate which is output to the output port 36.

At the time of start of operation of the heat and hydrogen generation device 50, fuel injected from the burner 57 is ignited by the glow plug 68. Due to this, the fuel and air which are fed from the burner 57 react in the burner combustion chamber 53, and whereby burner combustion is started. If burner combustion is started, the temperature of the reformer catalyst 54 gradually rises. At this time, the burner combustion is performed under a lean air-fuel ratio. Next, if the temperature of the reformer catalyst 54 reaches a temperature able to reform the fuel, the air-fuel ratio is normally switched from the lean air-fuel ratio to the rich air-fuel ratio and the reforming action of the fuel at the reformer catalyst 54 is started. If the reforming action of the fuel is started, hydrogen is generated and high temperature gas containing the generated hydrogen is made to flow out from a gas outflow port 74 of the gas outflow chamber 55. The high temperature gas flowing out from gas outflow port 74 is fed into the exhaust pipe 12 via the feed conduit 51 as shown in FIG. 1.

In this way, in the embodiment of the present invention, the heat and hydrogen generation device 50 is provided with the burner combustion chamber 53, the burner 57 arranged in the burner combustion chamber 53 for performing burner combustion, a fuel feed device able to control the amount of feed of the fuel fed from the burner 57 into the burner combustion chamber 53, an air feed device able to control the temperature and amount of feed of air fed from the burner 57 into the burner combustion chamber 53, the ignition device 68 for making the fuel ignite, and the reformer catalyst 54 to which the burner combustion gas is fed, and the air feed device is provided with the heat exchange part 62*a* for heating the air fed from the burner 57 into the burner combustion chamber 53 by the burner combustion gas. In this case, in the embodiment of the present invention, the fuel injector 58 forms the above-mentioned fuel feed device. The air chamber 60, air feed port 61, high temperature air flow passage 62, heat exchange part 62*a*, low temperature air flow passage 63, air pump 64, high temperature air valve 65, and low temperature air valve 66 form the above-mentioned air feed device.

Now then, in the embodiment of the present invention, hydrogen is generated by reforming fuel in the heat and hydrogen generation device 50. Therefore, first, referring to FIG. 3, reforming reactions in the case of using diesel fuel as fuel will be explained.

(a) to (c) in FIG. 3 show a reaction formula when a complete oxidation reaction is performed, a reaction formula when a partial oxidation reforming reaction is performed, and a reaction formula when a steam reforming reaction is performed, respectively, with reference to the case of using the generally used diesel fuel as fuel. Note that, the heating value $\Delta H^0$ in the reaction formulas are shown by the lower heating value (LHV). Now, as will be understood from (b) and (c) in FIG. 3, to generate hydrogen from diesel fuel, there are two methods: the method of performing the partial oxidation reforming reaction and the method of performing the steam reforming reaction. The steam reforming reaction is the method of adding steam to diesel fuel, and as will be understood from (C) in FIG. 3, this steam reforming reaction is an endothermic reaction. Therefore, to cause the steam reforming reaction, it is necessary to add heat from the outside. In large scale hydrogen generating plants, usually, to raise the efficiency of generation of hydrogen, in addition to the partial oxidation reforming reaction, the steam reforming reaction in which the generated heat is not discarded, but using the generated heat for generating hydrogen is used.

As opposed to this, in the present invention, to generate both hydrogen and heat, the steam reforming reaction using the generated heat for generating hydrogen is not used. In the present invention, only the partial oxidation reforming reaction is used to generate hydrogen. This partial oxidation reforming reaction, as will be understood from (b) in FIG. 3, is an exothermic reaction. Therefore, the reforming reaction proceeds by the heat generated on its own even without adding heat from the outside, and hydrogen is generated. Now, as shown by the reaction formula of the partial oxidation reforming reaction of (b) in FIG. 3, the partial oxidation reforming reaction is performed by a rich air-fuel ratio in which an $O_2/C$ molar ratio, showing the ratio of the air and fuel which are made to react, is 0.5. At this time, CO and $H_2$ are generated.

Figure 4:
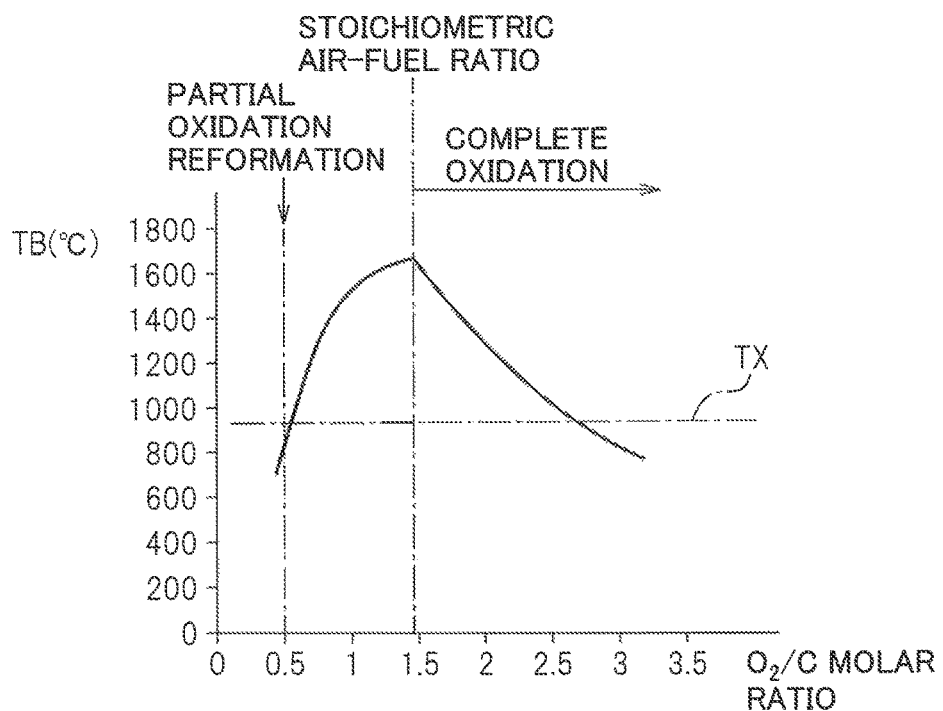
FIG. 4 is a view showing a relationship between a reaction equilibrium temperature TB and an $O_2/C$ molar ratio.

FIG. 4 shows the relationship between a reaction equilibrium temperature TB when the air and fuel are reacted at the reformer catalyst and reach equilibrium and the $O_2/C$ molar ratio of the air and fuel. Note that, the solid line in FIG. 4 shows the theoretical value when the air temperature is 25° C. As shown by the solid line in FIG. 4, when the partial oxidation reforming reaction is performed by a rich air-fuel ratio of an $O_2/C$ molar ratio=0.5, the equilibrium reaction temperature TB becomes substantially 830° C. Note that, the actual equilibrium reaction temperature TB at this time becomes somewhat lower than 830° C., but below, the equilibrium reaction temperature TB will be explained for an embodiment according to the present invention as the value shown by the solid line in FIG. 4.

On the other hand, as will be understood from the reaction formula of the complete oxidation reaction of (a) in FIG. 3, when the $O_2/C$ molar ratio=1.4575, the ratio of the air and fuel becomes the stoichiometric air-fuel ratio. As shown in FIG. 4, the reaction equilibrium temperature TB becomes the highest when the ratio of the air and fuel becomes the stoichiometric air-fuel ratio. When an $O_2/C$ molar ratio is between 0.5 and 1.4575, partially the partial oxidation reforming reaction is performed, while partially the complete oxidation reaction is performed. In this case, the larger the $O_2/C$ molar ratio, the greater the ratio by which the complete oxidation reaction is performed compared with the ratio by which the partial oxidation reforming reaction is performed, so the larger the $O_2/C$ molar ratio, the higher the reaction equilibrium temperature TB.

Figure 5:
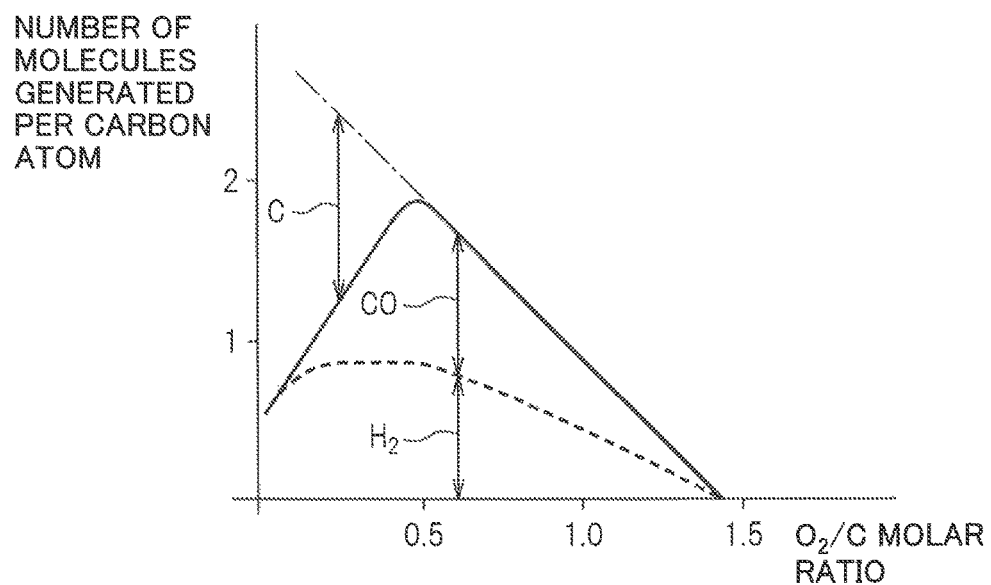
FIG. 5 is a view showing a relationship between a number of molecules generated per carbon atom and an $O_2/C$ molar ratio.

On the other hand, FIG. 5 shows the relationship between the number of molecules ($H_2$ and CO) produced per atom of carbon and the $O_2/C$ molar ratio. As explained above, the more the $O_2/C$ molar ratio exceeds 0.5, the less the ratio by which the partial oxidation reforming reaction is performed. Therefore, as shown in FIG. 5, the more the $O_2/C$ molar ratio exceeds 0.5, the smaller the amounts of generation of $H_2$ and CO. Note that, while not described in FIG. 5, if the $O_2/C$ molar ratio becomes larger than 0.5, due to the complete oxidation reaction shown in (a) of FIG. 3, the amounts of generation of $CO_2$ and $H_2O$ increase. In this regard, FIG. 5 shows the amounts of generation of $H_2$ and CO when assuming no water gas shift reaction shown in (d) of FIG. 3 occurs. However, in actuality, the water gas shift reaction shown in (d) of FIG. 3 occurs due to the CO generated by the partial oxidation reforming reaction and the $H_2O$ generated by the complete oxidation reaction, and hydrogen is generated by this water gas shift reaction as well.

Now then, as explained above, the more the $O_2/C$ molar ratio exceeds 0.5, the less the amounts of generation of $H_2$ and CO. On the other hand, as shown in FIG. 5, if the $O_2/C$ molar ratio becomes smaller than 0.5, excess carbon C unable to be reacted with increases. This excess carbon C deposits inside the pores of the substrate of the reformer catalyst, that is, a coking occurs. If the coking occurs, the reforming ability of the reformer catalyst remarkably falls. Therefore, to avoid the coking occurring, the $O_2/C$ molar ratio has to be kept from becoming smaller than 0.5. Further, as will be understood from FIG. 5, in a range where no excess carbon is produced, the amount of generation of hydrogen becomes largest when the $O_2/C$ molar ratio is 0.5. Therefore, in the embodiment of the present invention, when the partial oxidation reforming reaction is performed for generating hydrogen, to avoid the occurrence of the coking and enable hydrogen to be generated most efficiently, the $O_2/C$ molar ratio is in principle made 0.5.

On the other hand, even if the $O_2/C$ molar ratio is made larger than the stoichiometric air-fuel ratio of the $O_2/C$ molar ratio=1.4575, the complete oxidation reaction is performed, but the larger the $O_2/C$ molar ratio becomes, the greater the amount of air to be raised in temperature. Therefore, as shown in FIG. 4, if the $O_2/C$ molar ratio is made greater than the $O_2/C$ molar ratio=1.4575 showing the stoichiometric air-fuel ratio, the larger the $O_2/C$ molar ratio becomes, the more the reaction equilibrium temperature TB will fall. In this case, for example, if the $O_2/C$ molar ratio is made a lean air-fuel ratio of 2.6, when the air temperature is 25° C., the reaction equilibrium temperature TB becomes about 920° C.

Figure 6:
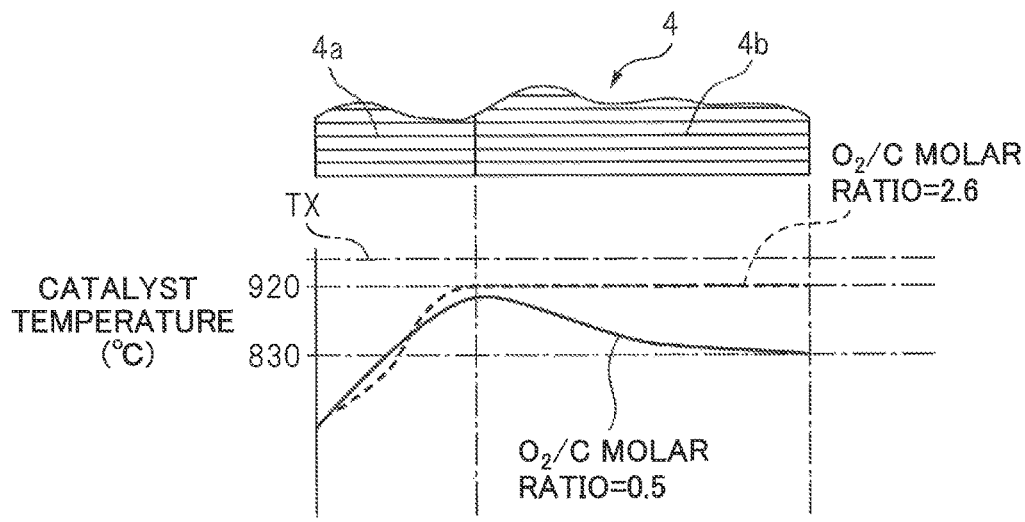
FIG. 6 is a view showing a temperature distribution in a reformer catalyst.

Now then, as explained above, when the operation of the heat and hydrogen generation device 50 shown in FIG. 2 is started, the burner combustion is performed under a lean air-fuel ratio, and thereby the temperature of the reformer catalyst 54 gradually rises. Next, if the temperature of the reformer catalyst 54 reaches a temperature able to reform the fuel, the air-fuel ratio is normally switched from a lean air-fuel ratio to a rich air-fuel ratio and a reforming action of fuel at the reformer catalyst 54 is started. If the reforming action of fuel is started, hydrogen is generated. FIG. 6 shows the temperature distribution inside the oxidizing part 54a and reforming part 54b of the reformer catalyst 54 when the reaction at the reformer catalyst 54 becomes an equilibrium state. Note that, this FIG. 6 shows the temperature distribution in the case where the outside air temperature is 25° C. and this outside air is fed through the low temperature air flow passage 63 shown in FIG. 2 from the burner 57 to the inside of the burner combustion chamber 53.

The solid line of FIG. 6 shows the temperature distribution inside the reformer catalyst 54 when the $O_2/C$ molar ratio of the air and fuel fed from the burner 57 is 0.5. As shown in FIG. 6, in this case, at the oxidizing part 54a of the reformer catalyst 54, the temperature of the reformer catalyst 54 rises toward the downstream side due to the heat of oxidation reaction due to the remaining oxygen. About when the combustion gas proceeds from inside the oxidizing part 54a of the reformer catalyst 54 to the inside of the reforming part 54b, the remaining oxygen in the combustion gas is consumed and a fuel reforming action is performed at the reforming part 54b of the reformer catalyst 54. This reforming reaction is an endothermic reaction. Therefore, the temperature inside the reformer catalyst 54 falls as the reforming action proceeds, that is, toward the downstream side of the reformer catalyst 54. The temperature of the downstream side end face of the reformer catalyst 54 at this time is 830° C. and matches the reaction equilibrium temperature TB when the $O_2/C$ molar ratio=0.5 shown in FIG. 4.

On the other hand, FIG. 6 shows by a broken line the temperature distribution inside the reformer catalyst 54 when the $O_2/C$ molar ratio of the air and fuel fed from the burner 57 is a lean air-fuel ratio of 2.6. In this case as well, the temperature inside the reformer catalyst 54 rises toward the downstream side reformer catalyst 54 due to the heat of oxidation reaction of the fuel inside the oxidizing part 54*a* of the reformer catalyst 54. On the other hand, in this case, no reforming action is performed inside the reforming part 54*b* of the reformer catalyst 54, so the temperature of the reformer catalyst 54 is maintained constant in the reforming part 54*b*. The temperature of the downstream side end face of the reformer catalyst 54 at this time is 920° C. and matches the reaction equilibrium temperature TB when the $O_2/C$ molar ratio=2.6 shown in FIG. 4. That is, the reaction equilibrium temperature TB of FIG. 4 shows the temperature of the downstream side end face of the reformer catalyst 54 when the outside air temperature is 25° C. and this outside air is fed through the low temperature air flow passage 63 shown in FIG. 2 from the burner 57 to the inside of the burner combustion chamber 53.

Figure 7:
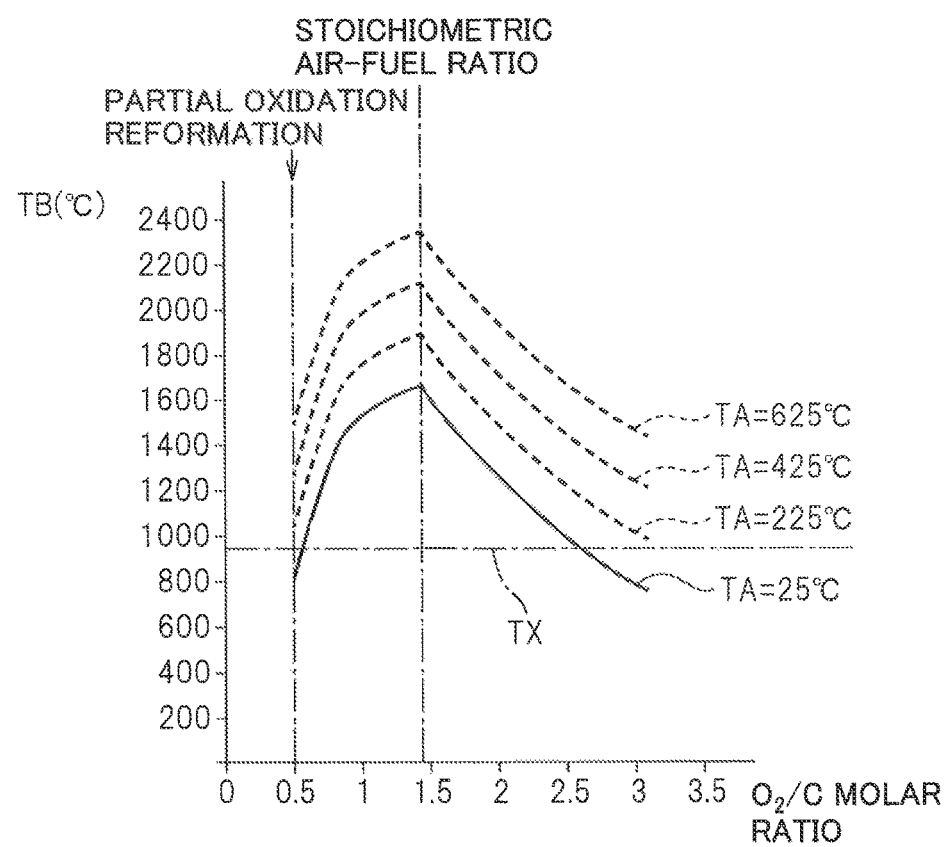
FIG. 7 is a view showing a relationship between a reaction equilibrium temperature TB and an $O_2/C$ molar ratio when the temperature TA of the air fed changes.

Next, referring to FIG. 7, the reaction equilibrium temperature TB when changing the temperature of the air reacted with the fuel at the reformer catalyst will be explained. FIG. 7, in the same way as FIG. 4, shows the relationship between the reaction equilibrium temperature TB when the air and fuel are made to react at the reformer catalyst and reach equilibrium and the $O_2/C$ molar ratio of the air and fuel. Note that, in FIG. 7, TA shows the air temperature. In this FIG. 7, the relationship between the reaction equilibrium temperature TB and the $O_2/C$ molar ratio shown by the solid line in FIG. 4 is shown again by a solid line. FIG. 7 further shows the relationships between the reaction equilibrium temperature TB and the $O_2/C$ molar ratio when changing the air temperature TA to 225° C., 425° C., and 625° C. by broken lines. From FIG. 7, it will be understood that the reaction equilibrium temperature TB becomes higher overall regardless of the $O_2/C$ molar ratio if the air temperature TA rises.

On the other hand, it is confirmed that the reformer catalyst 54 used in the embodiment of the present invention does not greatly deteriorate due to heat if the catalyst temperature is 950° C. or less. Therefore, in the embodiment of the present invention, 950° C. is made the allowable catalyst temperature TX enabling heat degradation of the reformer catalyst 54 to be avoided. This allowable catalyst temperature TX is shown in FIG. 4, FIG. 6, and FIG. 7. As will be understood from FIG. 6, when the air temperature TA is 25° C., both when the $O_2/C$ molar ratio is 0.5 or when the $O_2/C$ molar ratio is 2.6, the temperature of the reformer catalyst 54 when the reaction at the reformer catalyst 54 reaches an equilibrium state becomes the allowable catalyst temperature TX or less at all locations of the reformer catalyst 54. Therefore, in this case, it is possible to continue to use the reformer catalyst 54 without being concerned about heat degradation in practice.

On the other hand, as will be understood from FIG. 4, even when the air temperature TA is 25° C., if the $O_2/C$ molar ratio becomes slightly larger than 0.5, the temperature of the downstream side end face of the reformer catalyst 54 when the reaction at the reformer catalyst 54 reaches the equilibrium state, that is, the reaction equilibrium temperature TB, will end up exceeding the allowable catalyst temperature TX. If the $O_2/C$ molar ratio becomes slightly smaller than 2.6, the temperature of the downstream side end face of the reformer catalyst 54 when the reaction at the reformer catalyst 54 reaches the equilibrium state will end up exceeding the allowable catalyst temperature TX. Therefore, for example, when the reaction at the reformer catalyst 54 is in an equilibrium state, if causing a partial oxidation reforming reaction, the $O_2/C$ molar ratio can be made larger than 0.5, but the range by which the $O_2/C$ molar ratio can be enlarged is limited.

On the other hand, as will be understood from FIG. 7, if the air temperature TA becomes higher, when the reaction at the reformer catalyst 54 reaches an equilibrium state, even if making the $O_2/C$ molar ratio 0.5, the temperature of the downstream side end face of the reformer catalyst 54 when the reaction at the reformer catalyst 54 reaches an equilibrium state will become higher than the allowable catalyst temperature TX and, therefore, the reformer catalyst 54 will deteriorate due to heat. Therefore, when the air temperature TA becomes high, if the reaction at the reformer catalyst 54 becomes an equilibrium state, the $O_2/C$ molar ratio cannot be made 0.5. Therefore, in the embodiment of the present invention, when the reaction at the reformer catalyst 54 reaches an equilibrium state, the air temperature TA is made a low temperature of about 25° C., and the $O_2/C$ molar ratio is made 0.5 in a state maintaining the air temperature TA at about 25° C.

As explained above, in the embodiment of the present invention, when operation of the heat and hydrogen generation device 50 is started, burner combustion is started under a lean air-fuel ratio. This burner combustion under a lean air-fuel ratio is performed until the reforming action by the reformer catalyst 54 becomes possible. In other words, in the embodiment of the present invention, a warm-up operation of the heat and hydrogen generation device 50 is performed under a lean air-fuel ratio after startup of the heat and hydrogen generation device 50 until a reforming action by the reformer catalyst 54 becomes possible. In this case, if the temperature of the reformer catalyst 54 becomes 700° C. or so, a reforming action by the reformer catalyst 54 becomes possible. Therefore, in the embodiment of the present invention, a warm-up operation of the heat and hydrogen generation device 50 is performed under a lean air-fuel ratio after startup of the heat and hydrogen generation device 50 until the temperature of the reformer catalyst 54 becomes 700° C. During this time, the heat generated at the heat and hydrogen generation device 50 is made to flow out from the gas outflow port 74 of the gas outflow chamber 55, then, as shown in FIG. 1, is fed through the feed conduit 51 into the exhaust pipe 12. Next, if a reforming action by the reformer catalyst becomes possible, that is, if the temperature of the reformer catalyst 54 becomes 700° C., normally the air-fuel ratio is switched from a lean air-fuel ratio to a rich air-fuel ratio and the partial oxidation reforming reaction is performed. If the partial oxidation reforming reaction is performed, heat and hydrogen are generated at the reformer catalyst 54. These heat and hydrogen are made to flow out from the gas outflow port 74 of the gas outflow chamber 55, then are fed through the feed conduit 51 into the exhaust pipe 12.

Next, a purification action of exhaust gas by the exhaust treatment catalyst 13 arranged in the engine exhaust passage will be explained. Note that, as explained above, in the example shown in FIG. 1, this exhaust treatment catalyst 13 is comprised of an $NO_x$ storage catalyst. This $NO_x$ storage catalyst 13 carries a precious metal such as platinum Pt, palladium Pd, and rhodium Rh, and an alkali metal such as potassium K, sodium Na, and cesium Cs or an alkali earth metal such as barium Ba and calcium Ca. This $NO_x$ storage catalyst 13 has an $NO_x$ storage and release function of storing $NO_x$ contained in the exhaust gas when the air-fuel ratio of the exhaust gas flowing into the $NO_x$ storage catalyst 13 is lean and releasing the stored $NO_x$ from the $NO_x$ storage catalyst 13 when the air-fuel ratio of the exhaust gas flowing into the $NO_x$ storage catalyst 13 is rich. Further, in this $NO_x$ storage catalyst 13, the HC discharged from the engine is oxidized by the precious metal carried on the $NO_x$ storage catalyst 13. Therefore, this $NO_x$ storage catalyst 13 also has an HC removal function.

In this regard, the $NO_x$ storage rate to this $NO_x$ storage catalyst 13, that is, the $NO_x$ removal rate by the $NO_x$ storage catalyst 13 and the HC removal rate by the $NO_x$ storage catalyst 13, do not become sufficiently high unless the temperature of the $NO_x$ storage catalyst 13, that is, the exhaust treatment catalyst 13, becomes 200° C. or so. Therefore, at the time of engine startup, to obtain a high $NO_x$ removal rate and high HC removal rate by the $NO_x$ storage catalyst 13, the temperature of the $NO_x$ storage catalyst 13, that is, the exhaust treatment catalyst 13, has to be made to rise until a target warm-up temperature of about 200° C. In this regard, in the embodiment of the present invention, if the engine is started, a warm-up action of the exhaust treatment catalyst 13 is started by the exhaust gas discharged from the engine. However, a long time is required for making the temperature of the exhaust treatment catalyst 13 rise to the target warm-up temperature by exhaust gas. Therefore, in the embodiment of the present invention, to make the temperature of the exhaust treatment catalyst 13 quickly rise to the target warm-up temperature, at the same time as startup of the engine, operation of the heat and hydrogen generation device 50 is started, and the warm-up action of the exhaust treatment catalyst 13 is prompted by the heat and hydrogen fed from the heat and hydrogen generation device 50 to the exhaust treatment catalyst 13 or the heat fed from the heat and hydrogen generation device 50 to the exhaust treatment catalyst 13. Next, referring to FIG. 8A and FIG. 88B, a warm-up promotion action of the exhaust treatment catalyst 13 by the heat and hydrogen generation device 50 will be explained.

Figure 8A:
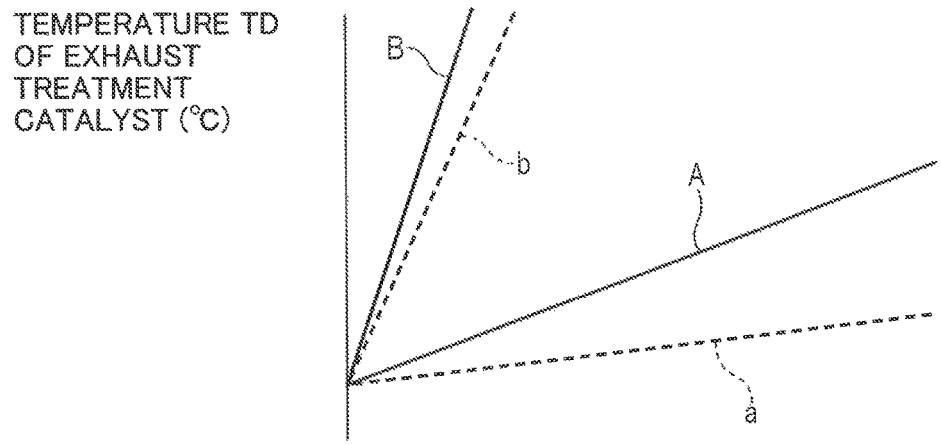
FIGS. 8A and 8B are views showing changes in the temperature TD of the exhaust treatment catalyst.

FIG. 8A and FIG. 88B show the change of the temperature TD of the exhaust treatment catalyst 13 when the warm up operation of the exhaust treatment catalyst 13 is performed by using the heat and hydrogen generation device 50 in the case where the exhaust treatment catalyst 13 carries a precious metal such as platinum Pt, palladium Pd, and rhodium Rh. Note that, in FIG. 8A and FIG. 8B, the abscissa shows the elapse of time. In these FIG. 8A and FIG. 88B, to facilitate the explanation, the warm-up action of the exhaust treatment catalyst 13 by the exhaust gas discharged from the engine is ignored. Further, in FIG. 8B, TK shows the temperature at which the precious metal becomes activated. In the example shown in FIG. 88B, this temperature TK at which the precious metal becomes activated is made 110° C. Note that, below, this temperature TK at which the precious metal becomes activated will be called the "activation temperature TK of the exhaust treatment catalyst 13".

Now, as will be understood from FIG. 3, if comparing the complete oxidation reaction and the partial oxidation reforming reaction, the complete oxidation reaction is far greater in amount of heat generated compared with the partial oxidation reforming reaction. Therefore, if the amount of fuel used is the same, the amount of heat fed to the exhaust treatment catalyst 13 is far larger when the complete oxidation reaction is performed in the heat and hydrogen generation device 50 compared to when the partial oxidation reforming reaction is performed in the heat and hydrogen generation device 50. In FIG. BA, when the amount of fuel used is the same, the change of temperature of the exhaust treatment catalyst 13 in case where the exhaust treatment catalyst 13 is warmed up by the heat generated when the complete oxidation reaction is performed by an $O_2/C$ molar ratio=2.6 is shown by the solid line A, while the change of temperature of the exhaust treatment catalyst 13 in case where the exhaust treatment catalyst 13 is warmed up by only the heat generated when the partial oxidation reforming reaction is performed by an $O_2/C$ molar ratio=0.5 is shown by the broken line "a". As will be understood by a comparison of the solid line A and broken line "a", the rate of rise of the temperature TD of the exhaust treatment catalyst 13 when the exhaust treatment catalyst 13 is warmed up by only the heat generated at the heat and hydrogen generation device 50 is faster in the case of the complete oxidation reaction than the partial oxidation reforming reaction.

On the other hand, at the time of warm-up of the exhaust treatment catalyst 13, if hydrogen is fed to the exhaust treatment catalyst 13 and an oxidation reaction of the hydrogen is performed on the precious metal, the temperature TD of the exhaust treatment catalyst 13 rapidly rises due to the heat of the oxidation reaction of the hydrogen. The broken line "b" of FIG. 8A shows the changes in temperature of the exhaust treatment catalyst 13 in case where the exhaust treatment catalyst 13 is warmed up by only the hydrogen generated when the partial oxidation reforming reaction is performed by $O_2/C$ molar ratio=0.5 under the same amount of fuel used, while the solid line B of FIG. 8A shows the changes in temperature of the exhaust treatment catalyst 13 in case where the exhaust treatment catalyst 13 is warmed up by the heat generated and the hydrogen generated when the partial oxidation reforming reaction is performed by $O_2/C$ molar ratio=0.5 under the same amount of fuel used. As will be understood by comparing the solid line A and the solid line B in FIG. 8A, when a warm-up action of the exhaust treatment catalyst 13 by hydrogen is also performed, the rate of rise of the temperature TD of the exhaust treatment catalyst 13 is far faster in the partial oxidation reforming reaction than the complete oxidation reaction.

That is, part of the heat of the combustion gas generated at the heat and hydrogen generation device 50 escapes to the outside while the combustion gas flows through the inside of the feed conduit 51. Further, this heat of combustion gas is just fed by heat transfer to the exhaust treatment catalyst 13, so in actuality the amount of heat used for heating the exhaust treatment catalyst 13 is not that great. As opposed to this, the hydrogen generated at the heat and hydrogen generation device 50 is not consumed until reaching the exhaust treatment catalyst 13, and the exhaust treatment catalyst 13 itself is directly heated by the heat of the oxidation reaction of hydrogen. Therefore, the exhaust treatment catalyst 13 is made to rapidly rise in temperature by the heat of the oxidation reaction of the hydrogen.

Figure 8B:
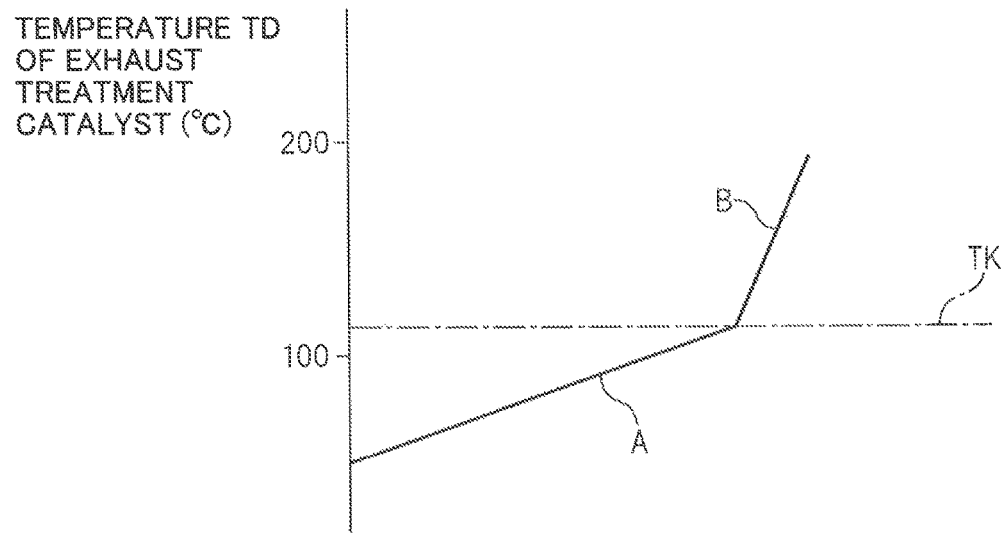

In this regard, when the temperature TD of the exhaust treatment catalyst 13 is lower than the activation temperature TK of the exhaust treatment catalyst 13 shown in FIG. 8B, even if hydrogen is fed to the exhaust treatment catalyst 13, no oxidation reaction of hydrogen is performed on the precious metal. Therefore, at this time, no heat of oxidation reaction is caused due to the oxidation reaction of hydrogen. Therefore, when the temperature TD of the exhaust treatment catalyst 13 is lower than the activation temperature TK of the exhaust treatment catalyst 13, as will be understood from FIG. 8A, the rate of rise of temperature of the exhaust treatment catalyst 13 becomes far faster when the complete oxidation reaction is performed at the heat and hydrogen generation device 50 compared with the partial oxidation reforming reaction in the heat and hydrogen generation device 50.

As opposed to this, when the temperature TD of the exhaust treatment catalyst 13 is higher than the activation temperature TK of the exhaust treatment catalyst 13, if the partial oxidation reforming reaction is performed at the heat and hydrogen generation device 50 and thereby hydrogen is fed to the exhaust treatment catalyst 13, the exhaust treatment catalyst 13 is made to quickly rise in temperature by the heat of oxidation reaction of the hydrogen. Therefore, it will be understood that to make the exhaust treatment catalyst 13 rise in temperature as quickly as possible, when the temperature TD of the exhaust treatment catalyst 13 is lower than the activation temperature TK of the exhaust treatment catalyst 13, as shown by the solid line A in FIG. 8B, it is preferable to perform the complete oxidation reaction at the heat and hydrogen generation device 50 to feed only heat to the exhaust treatment catalyst 13 and, when the temperature TD of the exhaust treatment catalyst 13 becomes higher than the activation temperature TK of the exhaust treatment catalyst 13, as shown by the solid line B in FIG. 8B, it is preferable to perform the partial oxidation reforming reaction at the heat and hydrogen generation device 50 to feed heat and hydrogen to the exhaust treatment catalyst 13.

However, in actuality, it is difficult to switch the reaction at the heat and hydrogen generation device 50 from the complete oxidation reaction to the partial oxidation reforming reaction at all times when the temperature TD of the exhaust treatment catalyst 13 becomes the activation temperature TK as shown in FIG. 8B. Therefore, in the embodiment of the present invention, when the reforming action by the reformer catalyst 54 becomes possible after startup of the heat and hydrogen generation device 50, if the temperature TD of the exhaust treatment catalyst 13 is higher than the activation temperature TK of the exhaust treatment catalyst 13 shown in FIG. 8B, the reaction at the heat and hydrogen generation device 50 is immediately switched from the complete oxidation reaction to the partial oxidation reforming reaction. On the other hand, when the reforming action by the reformer catalyst 54 becomes possible after startup of the heat and hydrogen generation device 50, if the temperature TD of the exhaust treatment catalyst 13 is lower than the activation temperature TK, the complete oxidation reaction is made to continue at the heat and hydrogen generation device 50 until the temperature TD of the exhaust treatment catalyst 13 becomes higher than the activation temperature TK, and when the temperature TD of the exhaust treatment catalyst 13 becomes higher than the activation temperature TK, the reaction at the heat and hydrogen generation device 50 is switched from the complete oxidation reaction to the partial oxidation reforming reaction. By doing this, it is possible to speed up the warm-up of the exhaust treatment catalyst 13 the fastest.

That is, in the embodiment of the present invention, the exhaust purification system of an internal combustion engine comprises the exhaust treatment catalyst 13 arranged in the engine exhaust passage and the heat and hydrogen generation device 50 able to feed only heat or heat and hydrogen to the exhaust treatment catalyst 13 so as to warm up the exhaust treatment catalyst 13. The heat and hydrogen generation device 50 is provided with the reformer catalyst 54 to which combustion gas of the fuel and air is fed. In this heat and hydrogen generation device 50, after the startup of the heat and hydrogen generation device 50, the warm-up operation of the heat and hydrogen generation device 50 is performed under a lean air-fuel ratio until the reforming action by the reformer catalyst 54 becomes possible. If the reforming action by the reformer catalyst 54 becomes possible, the partial oxidation reaction is performed and heat and hydrogen are generated. In this case, in the embodiment of the present invention, when the reforming action by the reformer catalyst 54 becomes possible after the warm-up operation of the heat and hydrogen generation device 50 is completed, if the temperature TD of the exhaust treatment catalyst 13 is the preset activation temperature TK or more, the partial oxidation reaction is performed at the heat and hydrogen generation device 50 and the generated heat and hydrogen are fed to the exhaust treatment catalyst 13. As opposed to this, when a reforming action by the reformer catalyst 54 becomes possible after the warm-up operation of the heat and hydrogen generation device 50 is completed, if the temperature TD of the exhaust treatment catalyst 13 is less than the preset activation temperature TK, the complete oxidation reaction by the lean air-fuel ratio is continued and only heat is fed to the exhaust treatment catalyst 13.

Further, in the embodiment of the present invention, when the warm-up operation of the heat and hydrogen generation device 50 is completed and the reforming action by the reformer catalyst 54 becomes possible, if the temperature TD of the exhaust treatment catalyst 13 is less than a preset activation temperature TK, the complete oxidation reaction by a lean air-fuel ratio is continued, then, if the temperature TD of the exhaust treatment catalyst 13 becomes the preset activation temperature TK or more, the complete oxidation reaction by a lean air-fuel ratio is switched to the partial oxidation reforming reaction.

Note that, the relationship shown in FIG. 8A and FIG. 8B is not limited to the case of using an $NO_x$ storage catalyst as the exhaust treatment catalyst 13. The relationship shown in FIG. 8A and FIG. 8B similarly arises even when using a catalyst carrying a precious metal such as platinum Pt, palladium Pd, and rhodium Rh as the exhaust treatment catalyst 13, for example, an oxidation catalyst. Therefore, the present invention can be applied even if using an oxidation catalyst as the exhaust treatment catalyst 13.

Next, referring to FIG. 9, the method of heat and hydrogen generation by the heat and hydrogen generation device 50 shown in FIG. 2 will be explained in brief. Note that this FIG. 9 shows the case where the temperature TD of the exhaust treatment catalyst 13 is the preset activation temperature TK or more when the warm-up operation of the heat and hydrogen generation device 50 is completed and the reforming action by the reformer catalyst 54 becomes possible. Further, in this FIG. 9, the operating state of the glow plug 68, the amount of feed of air from the burner 57, the amount of feed of fuel from the burner 57, the $O_2/C$ molar ratio of the air and fuel which are reacted, the temperature of the air fed from the burner 57, the temperature TC of the downstream side end face of the reformer catalyst 54, and the temperature TD of the exhaust treatment catalyst 13 are shown. Note that, the target temperatures for the temperature TC of the downstream side end face of the reformer catalyst 54 shown in FIG. 9 etc. and the target temperatures for the temperature of the reformer catalyst 54 are theoretical values, and in the embodiment of the present invention, as explained above, for example, the actual equilibrium reaction temperature TB becomes somewhat lower than the target temperature of 830° C. These target temperatures change depending on the structure of the heat and hydrogen generation device 50 etc. Therefore, in actuality, it is necessary to perform experiments to set in advance the optimum target temperatures corresponding to the structure of the heat and hydrogen generation device 50.

If the engine is started, the heat and hydrogen generation device 50 is simultaneously started. If the heat and hydrogen generation device 50 is started, the glow plug 68 is turned on. Next, air is fed through the high temperature air flow passage 62 to the burner combustion chamber 53. In this case, in FIG. 9, as shown by the broken line, the air can be fed through the high temperature air flow passage 62 to the burner combustion chamber 53, then the glow plug 68 turned on. Next, fuel is injected from the burner 57. If the fuel injected from the burner 57 is ignited by the glow plug 68, the amount of fuel is increased, the $O_2/C$ molar ratio of the air and fuel which are reacted is decreased from 4.0 to 3.0, and burner combustion is started in the burner combustion chamber 53. In the time period from when the feed of fuel is started to when the fuel is ignited, the air-fuel ratio is made a lean air-fuel ratio so as to keep down the amount of generation of HC as much as possible.

Next, burner combustion, that is, the complete oxidation reaction by a lean air-fuel ratio is continued. Due to this, the temperature of the reformer catalyst 54 is gradually made to rise. On the other hand, if burner combustion is started, the temperature of the gas flowing out through the reformer catalyst 54 to the gas outflow chamber 55 gradually rises. Therefore, the temperature of the air heated at the heat exchanger 62a due to this gas also gradually rises and as a result the temperature of the air fed from the high temperature air flow passage 62 to the burner combustion chamber 53 gradually rises. Due to this, the warm-up of the reformer catalyst 54 is promoted. In the embodiment of the present invention, the warm-up of the reformer catalyst 54 performed under a lean air-fuel ratio in this way will be referred to as "primary warm-up" as shown in FIG. 9, or "warm-up of the heat and hydrogen generation device 50". Note that, in the example shown in FIG. 9, the amount of feed of air and the amount of fuel are increased during this primary warm-up operation.

This primary warm-up operation, that is, the warm-up operation of the heat and hydrogen generation device 50, is continued until the fuel can be reformed at the reformer catalyst 54. In the example shown in FIG. 9, if the temperature TC of the downstream side end face of the reformer catalyst 54 becomes 700° C., it is judged that the fuel can be reformed at the reformer catalyst 54. Therefore, in the example shown in FIG. 9, the primary warm-up operation, that is, the warm-up operation of the heat and hydrogen generation device 50, is continued until the temperature TC of the downstream side end face of the reformer catalyst 54 becomes 700° C. Note that, in the example shown in FIG. 9, as shown in FIG. 9, the $O_2/C$ molar ratio of the air and fuel which are made to react is made 3.0 to 4.0 and the complete oxidation reaction by a lean air-fuel ratio is performed from when operation of the hydrogen generation device 50 is started to when primary warm-up of the reformer catalyst 54 is completed, that is, from when the operation of the hydrogen generation device 50 is started to when warm-up of the heat and hydrogen generation device 50 is completed. Of course, at this time, the temperature of the reformer catalyst 54 is considerably lower than the allowable catalyst temperature TX, so the $O_2/C$ molar ratio of the air and fuel which are made to react may also, for example, be made an $O_2/C$ molar ratio close to the stoichiometric air-fuel ratio such as 2.0 to 3.0.

On the other hand, if the engine is started, the temperature TD of the exhaust treatment catalyst 13 immediately rises a bit as shown in FIG. 9. Next, in the example shown in FIG. 9, while the primary warm-up operation, that is, the warm-up operation of the heat and hydrogen generation device 50, is being performed, the temperature TD of the exhaust treatment catalyst 13 rises a bit at a time, and the temperature TD of the exhaust treatment catalyst 13 exceeds the preset activation temperature TK while the primary warm-up operation, that is, the warm-up operation of the heat and hydrogen generation device 50, is being performed. Even if the temperature TD of the exhaust treatment catalyst 13 exceeds the preset activation temperature TK in this way, in the heat and hydrogen generation device 50, the complete oxidation reaction by a lean air-fuel ratio is continued. Next, the temperature TD of the exhaust treatment catalyst 13 further rises a bit at a time. In the example shown in FIG. 9, when the temperature TC of the downstream side end face of the reformer catalyst 54 becomes 700° C., the temperature TD of the exhaust treatment catalyst 13 becomes the preset activation temperature TK or more.

Next, if the temperature TC of the downstream side end face of the reformer catalyst 54 becomes 700° C., it is judged that fuel can be reformed at the reformer catalyst 54. At this time, the temperature TD of the exhaust treatment catalyst 13 becomes the preset activation temperature TK or more, and therefore the partial oxidation reforming reaction for generating hydrogen is started. In the embodiment of the present invention, at this time, as shown in FIG. 9, first, the secondary warm-up operation is performed, and if the secondary warm-up operation is completed, the normal operation is performed. This secondary warm-up operation is performed for generating hydrogen while further making the temperature of the reformer catalyst 54 rise. If the secondary warm-up operation is started, the heat and hydrogen generated at the heat and hydrogen generation device 50 are fed to the exhaust treatment catalyst 13. As a result, as shown in FIG. 9, the temperature TD of the exhaust treatment catalyst 13 rapidly rises.

On the other hand, this secondary warm-up operation is continued until the temperature TC of the downstream side end face of the reformer catalyst 54 reaches the reaction equilibrium temperature TB and shifts to the normal operation when the temperature TC of the downstream side end face of the reformer catalyst 54 reaches the reaction equilibrium temperature TB. Note that, when the secondary warm-up operation is started, the demanded value of the output heat amount (kW) of the heat and hydrogen generation device 50 required for making the temperature TD of the exhaust treatment catalyst 13 rise to the target warm-up temperature is calculated. In this case, the demanded value of this output heat amount (kW) basically is calculated based on the product of the temperature difference between the target warm-up temperature of the exhaust treatment catalyst 13 and the current exhaust gas temperature and the amount of exhaust gas discharged from the engine. If the demanded value of the output heat amount (kW) of the heat and hydrogen generation device 50 is calculated, the target fuel feed amount required for generating this demanded output heat amount (kW) is calculated. When the secondary warm-up operation is started, the amount of feed of fuel from the burner 57 is made this target fuel feed amount.

Note that, when the exhaust treatment catalyst 13 is comprised of an $NO_x$ storage catalyst, the above-mentioned target warm-up temperature of the exhaust treatment catalyst 13, as explained above, is made for example 200° C. Therefore, in the example shown in FIG. 9, the output heat amount (kW) of the heat and hydrogen generation device 50 required for making the temperature TD of the exhaust treatment catalyst 13 rise to 200° C. is made the demanded value. On the other hand, in FIG. 10A, the operating region GG of the heat and hydrogen generation device 1 where this secondary warm-up operation is performed is shown by the hatched region surrounded by the solid lines GL, GU, and GS. Note that in FIG. 10A, the ordinate shows the $O_2/C$ molar ratio of air and fuel which are made to react, while the abscissa shows the temperature TC of the downstream side end face of the reformer catalyst 54.

Figure 10A:
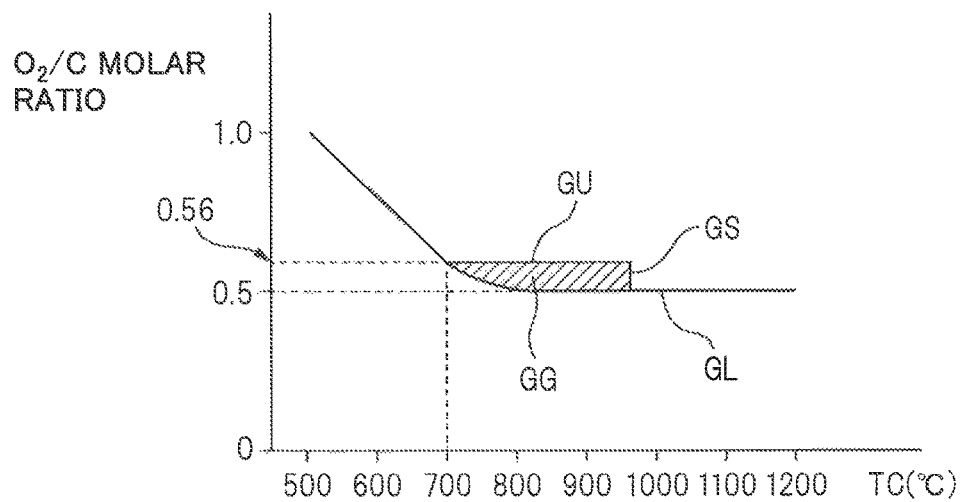
FIGS. 10A and 10B are views showing operation regions performing secondary warm-up.

As explained while referring to FIG. 5, if the $O_2/C$ molar ratio between the air and fuel which are made to react becomes smaller than 0.5, coking occurs. The solid line GL in FIG. 10A shows the boundary of the $O_2/C$ molar ratio with respect to the occurrence of coking. In the region where the $O_2/C$ molar ratio is smaller than this boundary GL, coking occurs. Note that, if the temperature of the reformer catalyst 54 becomes lower, even if the $O_2/C$ molar ratio becomes larger, that is, even if the degree of richness of the air-fuel ratio falls, the carbon C will deposit in the pores of the substrate of the reformer catalyst without being oxidized and coking will occur. Therefore, as shown in FIG. 10A, the boundary GL of the $O_2/C$ molar ratio causing coking becomes higher the lower the temperature of the reformer catalyst 54. Therefore, to avoid the occurrence of coking, the partial oxidation reforming reaction, that is, the secondary warm-up operation and the normal operation of the heat and hydrogen generation device 50, is performed on the boundary GL of this $O_2/C$ molar ratio or above the boundary GL.

On the other hand, in FIG. 10A, the solid line GU shows the upper limit guard value of the $O_2/C$ molar ratio for preventing the temperature of the reformer catalyst 54 from exceeding the allowable catalyst temperature TX at the time of the secondary warm-up operation of the heat and hydrogen generation device 50, while the solid line GS shows the upper limit guard value of the temperature TC of the downstream side end face of the reformer catalyst 54 for preventing the temperature of the reformer catalyst 54 from exceeding the allowable catalyst temperature TX at the time of the secondary warm-up operation of the heat and hydrogen generation device 50. After the secondary warm-up operation is started, the $O_2/C$ molar ratio is made 0.5. If the temperature TC of the downstream side end face of the reformer catalyst 54 reaches the reaction equilibrium temperature TB when $O_2/C$ molar ratio=0.5, the operation of the heat and hydrogen generation device 50 is shifted to the normal operation and hydrogen continues to be generated in the state maintaining the temperature TC of the downstream side end face of the reformer catalyst 54 at the reaction equilibrium temperature TB.

Figure 10B:
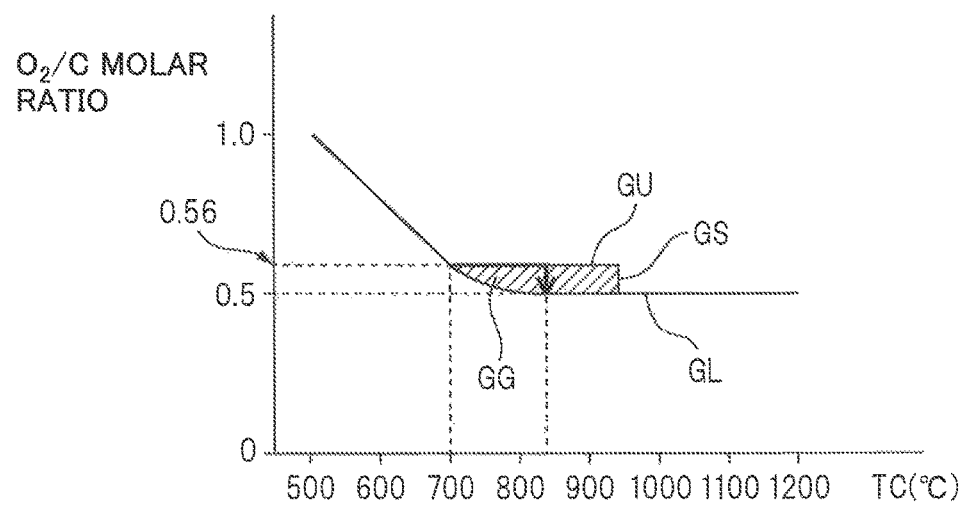
Figure 13:
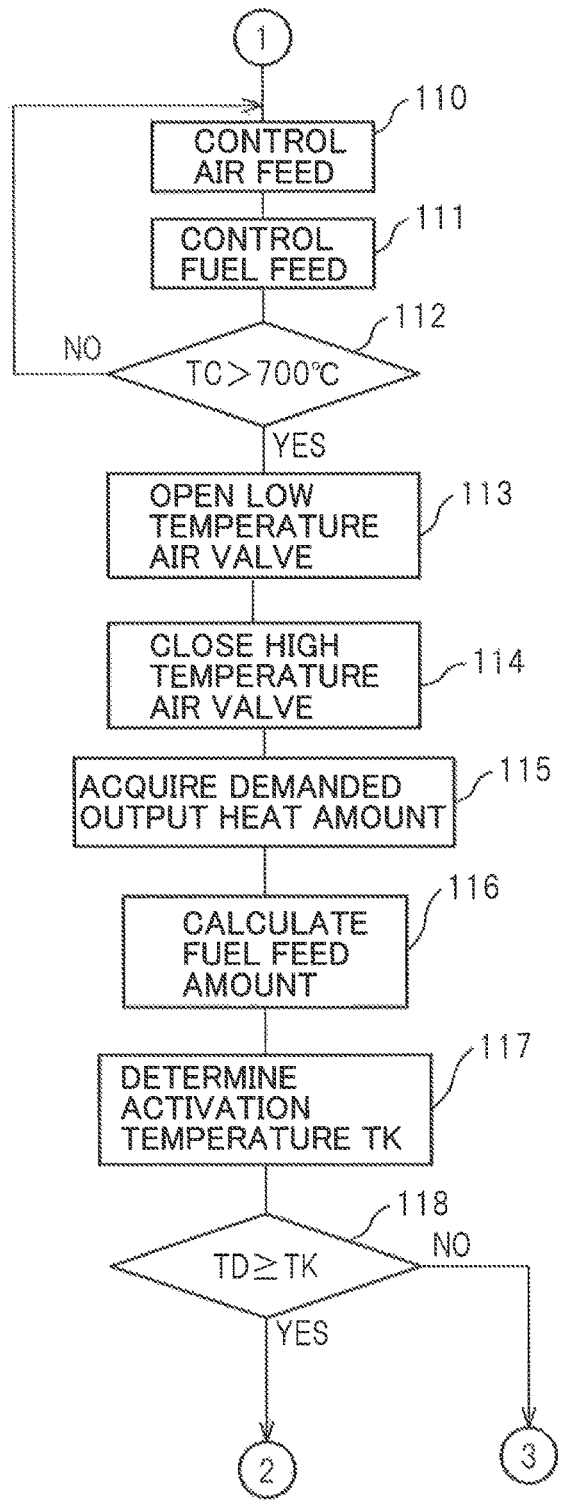
FIG. 13 is a flow chart for performing heat and hydrogen generation control.
Figure 14:
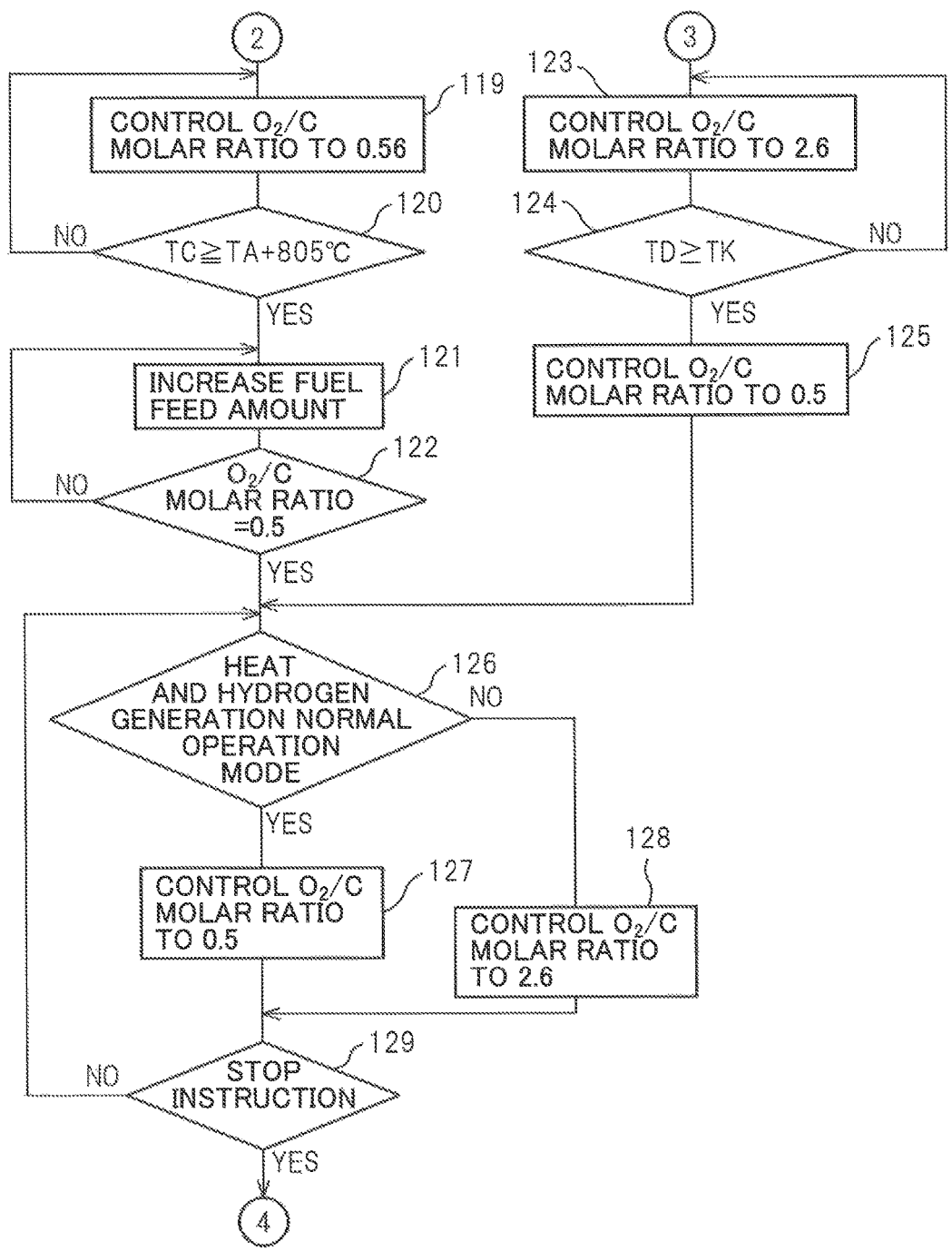
FIG. 14 is a flow chart for performing heat and hydrogen generation control.
Figure 15:
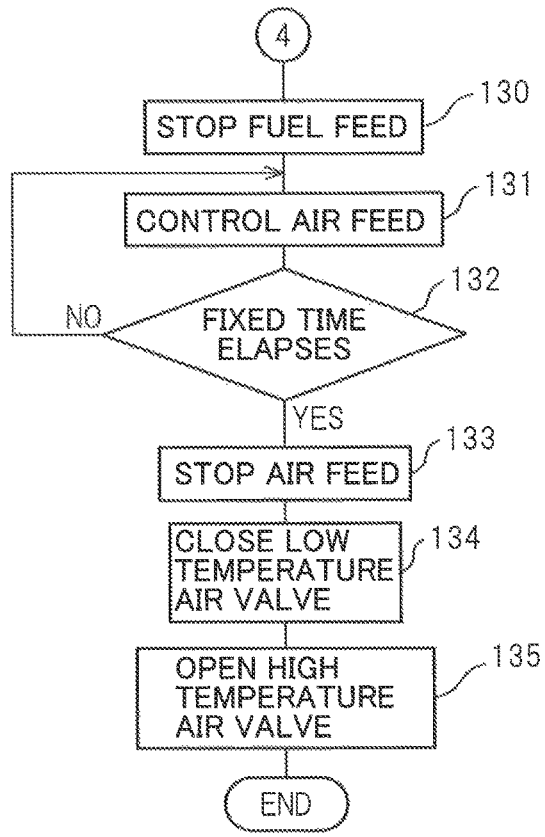
FIG. 15 is a flow chart for performing heat and hydrogen generation control.

FIG. 10B shows one example of the secondary warm-up operation control until shifting to normal operation. In the example shown in FIG. 10B, as shown by the arrow, if the temperature of the downstream side end face of the reformer catalyst 54 becomes 700° C., to promote the secondary warm-up of the reformer catalyst 54, the partial oxidation reforming reaction is started by the $O_2/C$ molar ratio=0.56, then the partial oxidation reforming reaction is continued by $O_2/C$ molar ratio=0.56 until the temperature TC of the downstream side end face of the reformer catalyst 54 becomes 830° C. Next, if the temperature of the downstream side end face of the reformer catalyst 54 becomes 830° C., the $O_2/C$ molar ratio is made to decrease until $O_2/C$ molar ratio=0.5. Next, if the $O_2/C$ molar ratio=0.5, the reforming reaction at the reformer catalyst 54 becomes the equilibrium state. Next, the $O_2/C$ molar ratio is maintained at 0.5 and the operation of the heat and hydrogen generation device 50 is shifted to the normal operation.

Now, in this way, when the reforming reaction in the reformer catalyst 54 becomes the equilibrium state, if the temperature TA of the air which is made to react with the fuel is high, as explained referring to FIG. 7, the reaction equilibrium temperature TB becomes higher. As a result, the temperature of the reformer catalyst 54 becomes higher than the allowable catalyst temperature TX, so the reformer catalyst 54 degrades under heat. Therefore, in the embodiment of the present invention, when the $O_2/C$ molar ratio is maintained at 0.5 and the reforming reaction at the reformer catalyst 54 is in the equilibrium state, the feed of the high temperature air from the high temperature air flow passage 62 to the burner combustion chamber 53 is stopped and low temperature air is fed from the low temperature air flow passage 63 to the burner combustion chamber 53. At this time, the temperature TC of the downstream side end face of the reformer catalyst 54 is maintained at 830° C., and therefore, the temperature of the reformer catalyst 54 is maintained at the allowable catalyst temperature TX or less. Therefore, it is possible to avoid heat degradation of the reformer catalyst 54 while generating hydrogen by the partial oxidation reforming reaction.

Note that, in the operating region GG shown in FIGS. 10A and 10B, when the secondary warm-up operation is being performed, the reforming reaction at the reformer catalyst 54 is not in the equilibrium state, so even if the air temperature TA is high, the temperature of the reformer catalyst 54 does not rise as shown in FIG. 7. However, this secondary warm-up operation is performed in the state of a high temperature of the reformer catalyst 54, so there is a danger of the temperature of the reformer catalyst 54 ending up becoming higher than the allowable catalyst temperature TX due to some reason or other. Therefore, in the embodiment of the present invention, to prevent the temperature of the reformer catalyst 54 from becoming higher than the allowable catalyst temperature TX, at the same time as the secondary warm-up operation is started, the feed of high temperature air from the high temperature air flow passage 62 to the burner combustion chamber 53 is stopped and low temperature air is fed from the low temperature air flow passage 63 to the burner combustion chamber 53. That is, as shown in FIG. 9, the temperature of the feed air is lowered. After that, low temperature air continues to be fed from the low temperature air flow passage 63 to the burner combustion chamber 53 until the normal operation is ended.

As explained above, when the temperature TA of the air which is made to react with the fuel is 25° C., the equilibrium reaction temperature TB when the $O_2/C$ molar ratio=0.5 becomes 830° C. Therefore, generally speaking, when the temperature of the air which is made to react with the fuel is TA° C., the equilibrium reaction temperature TB when the $O_2/C$ molar ratio=0.5 becomes (TA+805° C.). Therefore, in the embodiment of the present invention, when the temperature of the air which is made to react with the fuel is TA, if the secondary warm-up operation is started, the partial oxidation reforming reaction is continued by the $O_2/C$ molar ratio=0.56 until the temperature TC of the downstream side end face of the reformer catalyst 4 becomes (TA+805° C.). Next, when the temperature TC of the downstream side end face of the reformer catalyst 54 becomes (TA+805° C.), the $O_2/C$ molar ratio is decreased down to the $O_2/C$ molar ratio=0.5. Next, if the $O_2/C$ molar ratio=0.5, the $O_2/C$ molar ratio is maintained at 0.5.

Note that, the temperature TA of the air which is made to react with the fuel explained above means the temperature of the air used when calculating the equilibrium reaction temperature TB such as shown in FIG. 4 and is the temperature of air not affected by the heat of reaction of the burner combustion in the burner combustion chamber 53. For example, the air fed from the air feed port 61 or the air inside the air chamber 60 is affected by the heat of reaction of the burner combustion. These airs absorb the energy of the heat of reaction of the burner combustion and rise in temperature. Therefore, the temperature of these airs shows the temperature of the air already in the reaction process. Therefore, it is not the temperature of the air when calculating the equilibrium reaction temperature TB.

In this regard, it becomes necessary to calculate the equilibrium reaction temperature TB when the partial oxidation reforming reaction is being performed, that is, when low temperature air is being fed from the low temperature air flow passage 63 to the burner combustion chamber 53. Therefore, in the embodiment of the present invention, to detect the temperature of the air not affected by the heat of reaction of the burner combustion in the burner combustion chamber 53, as shown in FIG. 2, the temperature sensor 73 is arranged at the low temperature air flow passage 63 positioned at the outside of the heat insulating material 56. The temperature detected by this temperature sensor 73 is used as the temperature TA of the air when calculating the equilibrium reaction temperature TB.

On the other hand, if a stop instruction is issued, as shown in FIG. 9, the feed of fuel is stopped. At this time, if stopping the feed of air, there is the danger of the reformer catalyst 54 suffering from coking due to the fuel remaining inside the heat and hydrogen generation device 50. Therefore, in the embodiment of the present invention, to burn away the fuel remaining inside the heat and hydrogen generation device 50, as shown in FIG. 9, air continues to be fed for a while after a stop instruction is issued.

In this way, in the embodiment of the present invention, to prevent the temperature of the reformer catalyst 54 from becoming higher than the allowable catalyst temperature TX, at the same time as the secondary warm-up operation is started, the feed of high temperature air from the high temperature air flow passage 62 to the burner combustion chamber 53 is stopped and low temperature air is fed from the low temperature air flow passage 63 to the burner combustion chamber 53. In another manner of speaking, at this time, the air flow route for feeding air to the burner combustion chamber 53 is switched from the high temperature air flow route for feeding high temperature air to the low temperature air flow route for feeding low temperature air. To make it possible to switch the air flow route for feeding air to the burner combustion chamber 53 between the high temperature air flow route and the low temperature air flow route in this way, in the embodiment of the present invention, a switching device comprised of the high temperature air valve 65 and the low temperature air valve 66 is provided. In this case, in the embodiment of the present invention, the air flow route from the air cleaner 67 through the high temperature air flow passage 62 to the air feed port 61 corresponds to the high temperature air flow route, while the air flow route from the air cleaner 67 through the low temperature air flow passage 63 to the air feed port 61 corresponds to the low temperature air flow route.

Next, referring to FIG. 11, the case where, when the warm-up operation of the heat and hydrogen generation device 50 is completed and the reforming action by the reformer catalyst 54 becomes possible, the temperature TD of the exhaust treatment catalyst 13 is less than the preset activation temperature TK will be explained. Note that, in this FIG. 11, in the same way as FIG. 9, the operating state of the glow plug 68, the amount of feed of air from the burner 57, the amount of feed of fuel from the burner 57, the $O_2/C$ molar ratio of the air and fuel which are made to react, the temperature of the air fed from the burner 57, the temperature TC of the downstream side end face of the reformer catalyst 54, and the temperature TD of the exhaust treatment catalyst 13 are shown.

Referring to FIG. 11, even in the case shown in FIG. 11, if the engine is started up, the heat and hydrogen generation device 50 is simultaneously started up. If the engine is started up, the temperature TD of the exhaust treatment catalyst 13 immediately rises slightly. Next, while the primary warm-up operation, that is, the warm-up operation of the heat and hydrogen generation device 50, is being performed, that is, while the complete oxidation reaction by a lean air-fuel ratio is continuing in the heat and hydrogen generation device 50, the temperature TD of the exhaust treatment catalyst 13 rises a bit at a time. However, in the example shown in FIG. 11, unlike the case shown in FIG. 9, when a reforming action by the reformer catalyst 54 becomes possible, that is, when the temperature TC of a downstream side end face of the reformer catalyst 54 becomes 700° C., the temperature TD of the exhaust treatment catalyst 13 is still maintained at less than the preset activation temperature TK.

Note that, the operating state of the glow plug 68, the change of the amount of feed of air from the burner 57, the change of the amount of feed of fuel from the burner 57, the change of the $O_2/C$ molar ratio, the change of the temperature of the air feed from the burner 57, and the change of temperature TC of the downstream side end face of the reformer catalyst 54, which are shown in FIG. 11 at the time from when the heat and hydrogen generation device 50 is started to operate until the primary warm-up operation, that is, the warm-up operation of the heat and hydrogen generation device 50, is ended, are the same as the case shown in FIG. 9. Therefore, the explanation of the operating state of the glow plug 68, the change of the amount of feed of air from the burner 57, the change of the amount of feed of fuel from the burner 57, the change of the $O_2/C$ molar ratio, the change of the temperature of the air feed from the burner 57, and the change of the temperature TC of the downstream side end face of the reformer catalyst 54, which are shown in FIG. 11 at the time from when the heat and hydrogen generation device 50 is started to operate until the primary warm-up operation, that is, the warm-up operation of the heat and hydrogen generation device 50, is ended, will be omitted.

Now, as shown in FIG. 11, when the reforming action by the reformer catalyst 54 becomes possible, that is, when the temperature TC of the downstream side end face of the reformer catalyst 54 becomes 700° C., if the temperature TD of the exhaust treatment catalyst 13 is less than the preset activation temperature TK, the complete oxidation reaction by a lean air-fuel ratio is continued. Therefore, at this time, only heat is fed from the heat and hydrogen generation device 50 to the exhaust treatment catalyst 13 whereby the temperature TD of the exhaust treatment catalyst 13 is made to rise a bit at a time. This complete oxidation reaction by a lean air-fuel ratio is continued until the temperature TD of the exhaust treatment catalyst 13 reaches the preset activation temperature TK. Note that, in the embodiment of the present invention, the operation mode when the complete oxidation reaction by a lean air-fuel ratio is performed from when the temperature TC of the downstream side end face of the reformer catalyst 54 reaches 700° C. to when the temperature TD of the exhaust treatment catalyst 13 reaches the preset activation temperature TK will be called the "heat generation mode" as shown in FIG. 11.

As shown in FIG. 11, when the operation mode is the heat generation mode, the complete oxidation reaction is performed by a lean air-fuel ratio of an $O_2/C$ molar ratio=2.6.

Note that, even in the case shown in FIG. 11, when the operation mode is made the heat generation mode, the demanded value of the output heat amount (kW) of the heat and hydrogen generation device 50 required for making the temperature TD of the exhaust treatment catalyst 13 rise to the target warm-up temperature is calculated, then the target fuel feed amount required for generating the demanded output heat amount (kW) is calculated. In the example shown in FIG. 11, when the operation mode is made the heat generation mode, the amount of feed of fuel from the burner 57 is increased to this target fuel feed amount as shown in FIG. 11.

On the other hand, when the operation mode is made the heat generation mode, as will be understood from FIG. 11, the reforming action at the reformer catalyst 54 is not in the equilibrium state, so even if the air temperature TA is high, the temperature of the reformer catalyst 54 does not rise as shown in FIG. 7. However, at the time of the heat generation mode, the complete oxidation reaction by a lean air-fuel ratio is being performed in the state of a high temperature of the reformer catalyst 54, so there is the danger of the temperature of the reformer catalyst 54 ending up becoming higher than the allowable catalyst temperature TX for some reason or another. Therefore, in the embodiment of the present invention, to prevent the temperature of the reformer catalyst 54 from becoming higher than the allowable catalyst temperature TX, at the same time as the operation mode is made the heat generation mode, the feed of high temperature air from the high temperature air flow passage 62 to the burner combustion chamber 53 is stopped and low temperature air is fed from the low temperature air flow passage 63 to the burner combustion chamber 53. That is, as shown in FIG. 11, the temperature of the air feed is made to decrease. After that, low temperature air continues to be fed from the low temperature air flow passage 63 to the burner combustion chamber 53.

On the other hand, when the operation mode is made the heat generation mode, if the temperature TD of the exhaust treatment catalyst 13 reaches the preset activation temperature TK, the $O_2/C$ molar ratio is changed from 2.6 to 0.5 and the normal operation is started. At this time, the partial oxidation reforming reaction is performed by the $O_2/C$ molar ratio=0.5 and the heat and hydrogen generated at the heat and hydrogen generation device 50 are fed to the exhaust treatment catalyst 13. As a result, as shown in FIG. 11, the temperature TD of the exhaust treatment catalyst 13 is made to rapidly rise until the target warm-up temperature. Next, if a stop instruction is issued, as shown in FIG. 11, the feed of fuel is stopped then, after a while, the feed of air is stopped.

On the other hand, in the examples explained up to here, the activation temperature TK of the exhaust treatment catalyst 13, that is, the temperature TK at which the precious metal becomes activated, is made 110° C. In this regard, if a premixed charge combustion is performed in the engine combustion chamber 2, the concentration of the olefins in the exhaust gas increases. These olefins are adsorbed at the surface of the precious metal carried on the exhaust treatment catalyst 13 to act to poison the precious metal. Therefore, if the concentration of olefins in the exhaust gas increases, poisoning of the precious metal carried on the exhaust treatment catalyst 13 progresses. If poisoning of the precious metal progresses, the temperature TK at which the precious metal becomes activated, that is, the activation temperature TK of the exhaust treatment catalyst 13, becomes higher. Therefore, in the embodiment of the present invention, when a premixed charge combustion is being performed in the engine, the activation temperature TK preset for the exhaust treatment catalyst 13 is made higher.

Next, the heat and hydrogen generation control routine shown from FIG. 12 to FIG. 16 will be explained. This heat and hydrogen generation control routine is performed when the starter switch 43 of the engine shown in FIG. 1 is turned on or when during operation of the engine, the temperature of the reformer catalyst 4 falls, for example, below the target warm-up temperature. Note that, the starter switch 43 of the engine is sometimes manually turned on by the driver and sometimes automatically turned on like in a hybrid vehicle driven by an engine and electric motor.

If the heat and hydrogen generation control routine is performed, first, at step 100 of FIG. 12, based on the output signal of the temperature sensor 71, it is judged if the temperature TCU of the upstream side end face of the reformer catalyst 54 is a temperature at which an oxidation reaction can be performed on the upstream side end face of the reformer catalyst 54, for example, 300° C. or more. If the temperature TCU of the upstream side end face of the reformer catalyst 54 is 300° C. or less, the routine proceeds to step 101 where the glow plug 68 is turned on. Next, at step 102, it is judged if a fixed time has elapsed from when the glow plug 68 is turned on. When the fixed time has elapsed, the routine proceeds to step 103.

At step 103, the air pump 64 is made to operate and air is fed through the high temperature air flow passage 62 to the burner combustion chamber 53. Note that, when operation of the heat and hydrogen generation device 50 is stopped, the high temperature air valve 65 is opened and the low temperature air valve 66 is closed. Therefore, when the heat and hydrogen generation device 50 is made to operate, air is fed through the high temperature air flow passage 62 to the burner combustion chamber 53. Next, at step 104, the temperature TG of the glow plug 68 is calculated from the resistance value of the glow plug 68. Next, at step 105, it is judged if the temperature TG of the glow plug 68 exceeds 700° C. When it is judged that the temperature TG of the glow plug 68 does not exceed 700° C., the routine returns to step 103. As opposed to this, when it is judged that the temperature TG of the glow plug 68 exceeds 700° C., it is judged that ignition is possible and the routine proceeds to step 106.

At step 106, fuel is injected from the burner 57 to the burner combustion chamber 53. Next, at step 107, the temperature TCU of the upstream side end face of the reformer catalyst 54 is detected based on the output signal of the temperature sensor 71. Next, at step 108, it is judged if the fuel has been ignited from the output signal of the temperature sensor 71. If the fuel is ignited, the temperature TCU of the upstream side end face of the reformer catalyst 54 instantaneously rises. Therefore, it becomes possible to judge if fuel has been ignited from the output signal of the temperature sensor 71. When at step 108 it is judged that the fuel has not been ignited, the routine returns to step 106, while when at step 108 it is judged that the fuel has been ignited, the routine proceeds to step 109 where the glow plug 68 is turned off. Next, the routine proceeds to step 110 of FIG. 13. Note that if the fuel is ignited, the temperature TCU at the upstream side end face of the reformer catalyst 54 immediately becomes a temperature able to perform an oxidation reaction at the upstream side end face of the reformer catalyst 54, for example, 300° C. or more. On the other hand, when at step 100 it is judged that the temperature TCU of the upstream side end face of the reformer catalyst 54 is 300° C. or more, the routine proceeds to step 110.

At step 110 and step 111, the primary warm-up operation is performed. That is, at step 110, the amount of discharge of the air pump 65 is controlled, while at step 111, the amount of feed of fuel from burner 57 is controlled so that the $O_2/C$ molar ratio becomes 3.0. Note that, in the embodiment of the present invention, when this primary warm-up operation is being performed, as shown in FIG. 9 and FIG. 11, the amount of feed of air and the amount of feed of fuel are increased in stages. Next, at step 112, based on the output signal of the temperature sensor 72, it is judged if the temperature TC of the downstream side end face of the reformer catalyst 54 exceeds 700° C. When it is judged that the temperature TC of the downstream side end face of the reformer catalyst 4 does not exceed 700° C., the routine returns to step 110 where the primary warm-up operation, that is, the warm-up operation of the heat and hydrogen generation device 50, continues to be performed. As opposed to this, when it is judged that the temperature TC of the downstream side end face of the reformer catalyst 54 exceeds 700° C., the routine proceeds to step 113.

At step 113, the low temperature air valve 66 is opened and, at step 114, the high temperature air valve 65 is closed. Therefore, at this time, air is fed through the low temperature air flow passage 63 to the burner combustion chamber 53. Next, at step 115, the demanded value of the output heat amount (kW) of the heat and hydrogen generation device 50 required for making the temperature TD of the exhaust treatment catalyst 13 rise to the target warm-up temperature is calculated. Next, at step 116, the target fuel feed amount required for generating the demanded output heat amount (kW) is calculated.

Next, at step 117, the activation temperature TK of the exhaust treatment catalyst 13, that is, the temperature TK at which the precious metal becomes activated, is determined in accordance with the mode of combustion currently being performed in the engine. That is, when normal combustion by diffusion combustion is currently being performed in the engine, the activation temperature TK is made 110° C. As opposed to this, when the premixed charge combustion is currently being performed in the engine, the activation temperature TK is made a temperature higher than 110° C. The activation temperature TK when the premixed combustion is being performed in the engine is found in advance by experiments in accordance with the mode of the premixed charge combustion, for example, is made 140° C. If at step 117 the activation temperature TK is determined, the routine proceeds to step 118 where it is judged if the temperature TD of the exhaust treatment catalyst 13 is higher than the activation temperature TK. The temperature TD of the exhaust treatment catalyst 13 is found from one or both detection signals of the temperature sensor 25a and the temperature sensor 25b shown in FIG. 1.

When at step 118 it is judged that the temperature TD of the exhaust treatment catalyst 13 is higher than the activation temperature TK, the routine proceeds to step 119 where, as shown in FIG. 9, the secondary warm-up operation is started. That is, at step 119, the amount of discharge of the air pump 64 is made to decrease so that the $O_2/C$ molar ratio becomes 0.56 in the state where the amount of feed of fuel from the burner 57 is made the target fuel feed amount. At this time, the partial oxidation reforming reaction is started and heat and hydrogen are fed to the exhaust treatment catalyst 13. Next, at step 120, it is judged if the temperature TC of the downstream side end face of the reformer catalyst 54 reaches the sum (TA+805° C.) of the air temperature TA detected by the temperature sensor 73 and 805C. As explained above, this temperature (TA+805° C.) shows the reaction equilibrium temperature TB when the partial oxidation reforming reaction is performed by the $O_2/C$ molar ratio=0.5 when the air temperature is TA° C. Therefore, at step 120, it is judged if the temperature TC of the downstream side end face of the reformer catalyst 54 reaches the reaction equilibrium temperature (TA+805° C.).

When it is judged that the temperature TC of the downstream side end face of the reformer catalyst 54 does not reach the reaction equilibrium temperature (TA+805° C.), the routine returns to step 119 where the amount of discharge of the air pump 64 continues to be controlled so that the $O_2/C$ molar ratio becomes 0.56. As opposed to this, when at step 120 it is judged that the temperature TC of the downstream side end face of the reformer catalyst 54 reaches the reaction equilibrium temperature (TA+805° C.), the routine proceeds to step 121 where the amount of fuel injection is gradually increased to the amount of feed of fuel calculated at step 116 in the state where the amount of discharge of the air pump 15 is maintained constant. As a result, the $O_2/C$ molar ratio gradually decreases. Next, at step 122, it is judged if the $O_2/C$ molar ratio becomes 0.5. When it is judged that the $O_2/C$ molar ratio does not become 0.5, the routine returns to step 121. As opposed to this, when at step 122 it is judged that the $O_2/C$ molar ratio becomes 0.5, it is judged that the secondary warm-up operation has been completed. When it is judged that the secondary warm-up operation has been completed, the routine proceeds to step 126 where the normal operation is performed.

On the other hand, when at step 118 it is judged that the temperature TD of the exhaust treatment catalyst 13 is less than the activation temperature TK, the routine proceeds to step 123 where, as shown in FIG. 11, the operation mode is made the heat generation mode. That is, at step 123, fuel is injected from the burner 57 by an amount of feed of fuel calculated at step 116, and the amount of discharge of the air pump 64 is controlled to give the $O_2/C$ molar ratio 2.6. At this time, the complete oxidation reaction under a lean air-fuel ratio is continued and only heat is fed to the exhaust treatment catalyst 13. Next, at step 124, it is judged if the temperature TD of the exhaust treatment catalyst 13 reaches the activation temperature TK. When the temperature TD of the exhaust treatment catalyst 13 does not reach the activation temperature TK, the routine returns to step 123.

As opposed to this, when at step 124 it is judged that the temperature TD of the exhaust treatment catalyst 13 reaches the activation temperature TK, the routine proceeds to step 125 where the amount of discharge of the air pump 64 is made to decrease so that the $O_2/C$ molar ratio becomes 0.5 in the state maintaining the amount of feed of fuel from the burner 57 as it is. At this time, the partial oxidation reforming reaction is started and heat and hydrogen are fed to the exhaust treatment catalyst 13. Next, the routine proceeds to step 126 where the normal operation is performed.

In this regard, in the embodiment of the present invention, as the operation modes at the time of the normal operation, two normal operation modes: a heat and hydrogen generation normal operation mode and a heat generation normal operation mode, can be selected. The heat and hydrogen generation normal operation mode is a normal operation mode where the partial oxidation reforming reaction is performed by the $O_2/C$ molar ratio=0.5. In this heat and hydrogen generation normal operation mode, heat and hydrogen are generated. On the other hand, the heat generation normal operation mode is for example a normal operation mode where the complete oxidation reaction is performed by the $O_2/C$ molar ratio=2.6. In this heat generation normal operation mode, hydrogen is not generated.

Only heat is generated. These heat and hydrogen generation normal operation mode and heat generation normal operation mode are selectively used in accordance with need.

Now, if returning to FIG. 14, at step 126, it is judged if the mode is the heat and hydrogen generation normal operation mode. When at step 121 it is judged that the mode is the heat and hydrogen generation normal operation mode, the routine proceeds to step 127 where the partial oxidation reforming reaction is performed by the $O_2/C$ molar ratio=0.5 by adjusting the amount of feed of air in the state fixing the amount of feed of fuel. At this time, heat and hydrogen are generated and the heat and hydrogen are fed to the exhaust treatment catalyst 13. Next, the routine proceeds to step 129. On the other hand, when at step 126 it is judged that the mode is not the heat and hydrogen generation normal operation mode, that is, when it is judged that the mode is the heat generation normal operation mode, the routine proceeds to step 128 where the complete oxidation reaction is performed by the $O_2/C$ molar ratio=2.6 by adjusting the amount of feed of air in the state fixing the amount of feed of fuel. At this time, only heat is generated and only heat is fed to the exhaust treatment catalyst 13. Next, the routine proceeds to step 129.

At step 129, it is judged if the operation of the heat and hydrogen generation device 50 should be stopped. In this case, in the embodiment of the present invention, when the normal operation is continued for a fixed time period, when the temperature TD of the exhaust treatment catalyst 13 reaches the target warm-up temperature, or when an instruction for stopping operation of the heat and hydrogen generation device 50 is issued for another reason, it is judged that operation of the heat and hydrogen generation device 50 should be stopped. When at step 129 it is judged that operation of the heat and hydrogen generation device 50 should not be stopped, the routine returns to step 126. As opposed to this, when at step 129 it is judged that the operation of the heat and hydrogen generation device 50 should be stopped, the routine proceeds to step 130 where fuel injection from the burner 57 is stopped.

Next, at step 131, to burn off the remaining fuel, air continues to be fed from the air pump 64. Next, at step 132, it is judged if a fixed time has elapsed. When it is judged that the fixed time has not elapsed, the routine returns to step 131. As opposed to this, when at step 132 it is judged that the fixed time has elapsed, the routine proceeds to step 133 where operation of the air pump 65 is stopped and the feed of air to the burner combustion chamber 53 is stopped. Next, at step 134, the low temperature air valve 66 is closed while, at step 135, the high temperature air valve 65 is opened. Next, while the operation of the heat and hydrogen generation device 50 is being made to stop, the low temperature air valve 66 continues closed and the high temperature air valve 65 continues open.

Figure 16:
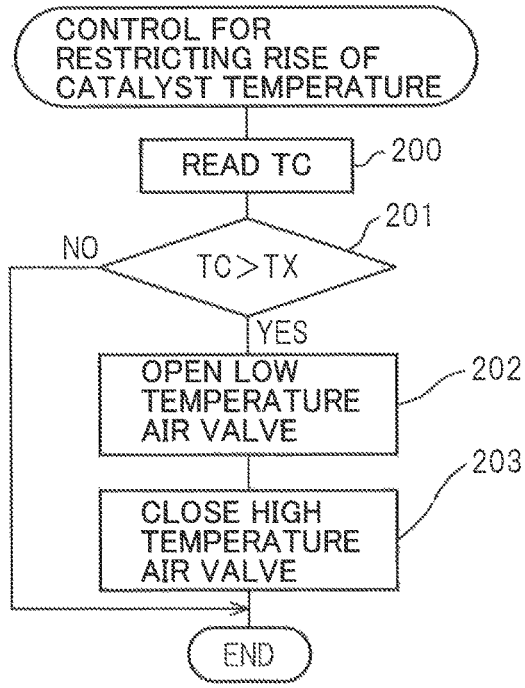
FIG. 16 is a flow chart for control for restricting the rise of the catalyst temperature.

Next, referring to FIG. 16, the control routine for restricting the rise of the catalyst temperature will be explained. This routine is executed by interruption every fixed time interval. Referring to FIG. 16, first, at step 200, the temperature TC of the downstream side end face of the reformer catalyst 54 detected by the temperature sensor 72 is read. Next, at step 201, it is judged if the temperature TC of the downstream side end face of the reformer catalyst 54 exceeds the allowable catalyst temperature TX. When it is judged that the temperature TC of the downstream side end face of the reformer catalyst 54 does not exceed the allowable catalyst temperature TX, the processing cycle is ended.

As opposed to this, when at step 201 it is judged that the temperature TC of the downstream side end face of the reformer catalyst 54 exceeds the allowable catalyst temperature TX, the routine proceeds to step 202 where the low temperature air valve 66 is opened. Next, at step 203, the high temperature air valve 65 is closed. Next, the processing cycle is ended. That is, during operation of the heat and hydrogen generation device 50, when the temperature TC of the downstream side end face of the reformer catalyst 54 exceeds the allowable catalyst temperature TX, the air flow route for feeding air to the burner combustion chamber 53 is switched from the high temperature air flow route for feeding high temperature air to the low temperature air flow route for feeding low temperature air, and thereby the temperature of the burner combustion-use air fed to the burner combustion chamber 53 is made to fall.

The invention claimed is:

1. An exhaust purification system of an internal combustion engine comprising:
    an exhaust treatment catalyst arranged in an engine exhaust passage,
    a heat and hydrogen generation device able to feed only heat or heat and hydrogen to the exhaust treatment catalyst so as to warm up the exhaust treatment catalyst, said heat and hydrogen generation device being provided with a reformer catalyst to which a combustion gas of fuel and air is fed; and
    an electronic control unit,
    wherein said electronic control unit is configured to perform an operation for warm-up of said heat and hydrogen generation device under a lean air-fuel ratio after startup of said heat and hydrogen generation device until a reforming action by the reformer catalyst becomes possible,
    said electronic control unit is configured to perform a partial oxidation reaction at said heat and hydrogen generation device and feed a generated heat and hydrogen to the exhaust treatment catalyst if a temperature of the exhaust treatment catalyst is a preset activation temperature or more when the warm-up operation of said heat and hydrogen generation device is completed and a reforming action by the reformer catalyst becomes possible,
    said electronic control unit is configured to continue a complete oxidation reaction by a lean air-fuel ratio and feed a heat to the exhaust treatment catalyst if the temperature of the exhaust treatment catalyst is less than the preset activation temperature when the warm-up operation of said heat and hydrogen generation device is completed and a reforming action by the reformer catalyst becomes possible, and
    said heat and hydrogen generation device is provided with a burner, a burner combustion chamber, and a heat exchanger for heating air fed from the burner to the burner combustion chamber by burner combustion gas, said heat and hydrogen generation device is further provided with a switching device for switching an air flow route feeding air from the burner to the burner combustion chamber between a high temperature air flow route feeding air heated at the heat exchanger and a low temperature air flow route feeding air lower in temperature than the air heated at the heat exchanger, the air flow route feeding air from the burner to the burner combustion chamber is made the high temperature air flow route at the time of the warm-up operation of said heat and hydrogen generation device, and the air flow route feeding air from the burner to the burner combustion chamber is switched from the high temperature air flow route to the low temperature air flow route when the warm-up operation of said heat and hydrogen generation device is completed and a reforming action by the reformer catalyst becomes possible.

2. The exhaust purification system of an internal combustion engine according to claim 1, wherein if the temperature of the exhaust treatment catalyst is less than the preset activation temperature when the warm-up operation of said heat and hydrogen generation device is completed and a reforming action by the reformer catalyst becomes possible, when the temperature of the exhaust treatment catalyst becomes the preset activation temperature or more after the complete oxidation reaction by a lean air-fuel ratio is continued, the complete oxidation reaction by a lean air-fuel ratio is switched to the partial oxidation reaction.

3. The exhaust purification system of an internal combustion engine according to claim 1, wherein when a premixed charge combustion is being performed in the engine, the activation temperature preset for the exhaust treatment catalyst is made higher.

\* \* \* \* \*